(12) United States Patent
Kawakami

(10) Patent No.: US 11,072,392 B2
(45) Date of Patent: Jul. 27, 2021

(54) BICYCLE OPERATING DEVICE

(71) Applicant: Shimano Inc., Osaka (JP)

(72) Inventor: Tatsuya Kawakami, Osaka (JP)

(73) Assignee: Shimano Inc., Osaka (JP)

( * ) Notice: Subject to any disclaimer, the term of this patent is extended or adjusted under 35 U.S.C. 154(b) by 99 days.

(21) Appl. No.: 16/184,619

(22) Filed: Nov. 8, 2018

(65) Prior Publication Data

US 2020/0148305 A1 May 14, 2020

(51) Int. Cl.
*B62M 25/04* (2006.01)
*F16C 1/12* (2006.01)
*G05G 5/05* (2006.01)
*G05G 1/04* (2006.01)

(52) U.S. Cl.
CPC .............. *B62M 25/04* (2013.01); *F16C 1/12* (2013.01); *G05G 1/04* (2013.01); *G05G 5/05* (2013.01); *G05G 2505/00* (2013.01)

(58) Field of Classification Search
CPC .... B62M 25/04; B62M 25/045; B62M 25/02; B62K 23/06; B62K 23/04; B62L 3/026; B62L 3/06; G05G 1/04; G05G 5/05; G05G 2505/00; F16C 1/12; F16C 1/18; Y10T 74/20438; Y10T 74/20274; Y10T 74/2028
See application file for complete search history.

(56) References Cited

U.S. PATENT DOCUMENTS

| | | | | |
|---|---|---|---|---|
| 4,644,816 A | * | 2/1987 | Cockburn | B62L 3/02 74/502.2 |
| 4,785,683 A | * | 11/1988 | Buckley | B62L 3/02 188/204 R |
| 4,840,082 A | * | 6/1989 | Terashima | B60T 11/16 74/489 |
| 4,850,241 A | * | 7/1989 | Buckley | B60T 11/06 74/502.2 |
| 5,309,786 A | * | 5/1994 | Pare | B60T 7/045 74/501.5 R |
| 6,457,378 B2 | * | 10/2002 | Hatakoshi | B62K 23/06 74/489 |
| 7,437,969 B2 | | 10/2008 | Ose | |
| 9,085,336 B2 | * | 7/2015 | Kawakami | B62M 25/04 |
| 9,156,518 B2 | * | 10/2015 | Kawakami | B62K 23/06 |

(Continued)

FOREIGN PATENT DOCUMENTS

JP 2007-1561 A 1/2007

*Primary Examiner* — Daniel D Yabut
(74) *Attorney, Agent, or Firm* — Global IP Counselors, LLP

(57) ABSTRACT

A bicycle operating device comprises a base, a user operated input, a cable actuator and a positioning abutment. The user operated input is movably arranged with respect to the base from a rest position towards an operated position. The cable actuator is movably arranged with respect to the base in response to movement of the user operated input between at least first and second cable holding positions. The positioning abutment is movably supported on the base between at least a first abutment position and a second abutment position. The positioning abutment selectively engages the user operated input to position the user operated input at an adjusted rest position in a state after the user operated input has been moved from the rest position to the operated position. The adjusted rest position is different from the rest position.

21 Claims, 17 Drawing Sheets

(56) References Cited

U.S. PATENT DOCUMENTS

| | | | | |
|---|---|---|---|---|
| 9,199,688 B2* | 12/2015 | Shahana | ............... | B62K 23/06 |
| 2006/0070483 A1* | 4/2006 | Dimsey | ................ | B62L 3/02 |
| | | | | 74/525 |
| 2007/0068317 A1* | 3/2007 | Krupin | ................ | B60T 7/104 |
| | | | | 74/502.2 |
| 2008/0076640 A1* | 3/2008 | Lin | ................ | A63B 21/4021 |
| | | | | 482/92 |
| 2008/0202887 A1* | 8/2008 | Lavezzi | ............... | B62K 23/06 |
| | | | | 192/85.62 |
| 2008/0264197 A1 | 10/2008 | Shahana | | |
| 2009/0301252 A1* | 12/2009 | Hsu | ............... | B62K 23/06 |
| | | | | 74/489 |
| 2012/0006146 A1* | 1/2012 | Warren | ................ | G05G 1/04 |
| | | | | 74/524 |

* cited by examiner

BICYCLE OPERATING DEVICE

BACKGROUND

Technical Field

The present invention generally relates to a bicycle operating device.

Background Information

Bicycles are typically provided with one or more bicycle operating devices for operating one or more bicycle components. A conventional bicycle operating device includes a base member, an actuator connected to a cable of a bicycle component, and one or more user operated inputs (operating members). The user operated inputs are arranged to be movable with respect to the base member to move the actuator. In accordance with operation of the user operated inputs, the actuator moves with respect to the base member, and the bicycle component is operated via the cable being pulled or released.

SUMMARY

Generally, the present disclosure is directed to various features of a bicycle operating device. In one feature, a bicycle operating device is provided in which a rest position of the user operated input can be adjusted. In another feature, a bicycle operating device is provided that is capable of pulling and releasing a cable by movement of one user operated input.

In view of the state of the known technology and in accordance with a first aspect of the present disclosure, a bicycle operating device is provided that basically comprises a base, a user operated input, a cable actuator and a positioning abutment. The user operated input is movably arranged with respect to the base from a rest position towards an operated position. The cable actuator is movably arranged with respect to the base in response to movement of the user operated input between at least first and second cable holding positions. The positioning abutment is movably supported on the base between at least a first abutment position and a second abutment position. The positioning abutment selectively engages the user operated input to position the user operated input at an adjusted rest position in a state after the user operated input has been moved from the rest position to the operated position. The adjusted rest position is different from the rest position With the bicycle operating device according to the first aspect, it is possible to improve the usability of the bicycle operating device.

In accordance with a second aspect of the present disclosure, a bicycle operating device is provided that basically comprises a base, a user operated input, a cable actuator and a rest position adjuster. The base supports a housing having a sidewall. The user operated input is movably arranged with respect to the base from a rest position towards an operated position. The cable actuator is movably arranged with respect to the base in response to movement of the user operated input. The cable actuator is disposed in the housing. The rest position adjuster is movably arranged with respect to the base to selectively adjust an adjusted rest position of the user operated input in a state after the user operated input has been moved from the rest position to the operated position. The adjusted rest position is different from the rest position. A part of the rest position adjuster extends outside of the sidewall of the housing.

With the bicycle operating device according to the second aspect, it is possible to improve the usability of the bicycle operating device.

In accordance with a third aspect of the present disclosure, a bicycle operating device is provided that basically comprises a base, a user operated input and a cable actuator. The user operated input is movably arranged with respect to the base from a rest position towards an operated position. The cable actuator is movably arranged with respect to the base in response to movement of the user operated input. The cable actuator includes a positioning ratchet and a cable holder. The positioning ratchet and the cable holder are separate pieces that are coupled and move together. The positioning ratchet and the cable holder define a cable path therebetween.

With the bicycle operating device according to the third aspect, it is possible to reliably attach a cable to the positioning ratchet.

In accordance with a fourth aspect of the present disclosure, the bicycle operating device according to the first aspect is configured so that the positioning abutment is pivotally arranged with respect to the base in a first direction and slidably arranged with respect to the base in a second direction that is different from the first direction.

With the bicycle operating device according to the fourth aspect, it is possible for a user to operate the user operated input in two directions to move the cable actuator from one of the first and second cable holding positions to the other of the first and second cable holding positions.

In accordance with a fifth aspect of the present disclosure, the bicycle operating device according to the fourth aspect further comprises a positioning catch movably arranged with respect to the base. The cable actuator is selectively maintained in each of the first and second cable holding positions by the positioning catch. The positioning abutment is arranged to move the positioning catch as the positioning abutment moves in the second direction.

With the bicycle operating device according to the fifth aspect, it is possible to appropriately position the cable actuator in each of the first position and the second position, and to easily release the cable actuator.

In accordance with a sixth aspect of the present disclosure, the bicycle operating device according to the fifth aspect is configured so that the user operated input is pivotally mounted with respect to the base about a pivot axis in a third direction and a fourth direction from the adjusted rest position.

With the bicycle operating device according to the sixth aspect, it is possible to easily operate the user operated input and move the cable actuator with a simple configuration.

In accordance with a seventh aspect of the present disclosure, the bicycle operating device according to the sixth aspect is configured so that the positioning catch has a first contact point and a second contact point. The positioning catch is arranged to move in response to receiving a moving force at the first contact point as the user operated input pivots in the third direction from the adjusted rest position. The positioning catch is arranged to move in response to receiving a moving force at the second contact point as the user operated input pivots in the fourth direction from the adjusted rest position.

With the bicycle operating device according to the seventh aspect, it is possible for a user to easily release the cable actuator by operating the user operated input in either of two different directions.

In accordance with an eighth aspect of the present disclosure, the bicycle operating device according to the sixth or seventh aspect is configured so that the positioning catch has a positioning position and a release position, which differs from the positioning position. The user operated input is operated from the adjusted rest position in the third direction to move the positioning catch from the positioning position towards the release position. The user operated input is operated from the adjusted rest position in the fourth direction to move the positioning catch from the positioning position towards the release position.

With the bicycle operating device according to the eighth aspect, it is possible for a user to easily move the positioning catch to release the cable actuator by operating the user operated input in in either of two different directions.

In accordance with a ninth aspect of the present disclosure, the bicycle operating device according to any one of the first to eighth aspects is configured so that the cable actuator includes a positioning ratchet and a cable holder. The positioning ratchet and the cable holder are coupled and move together.

With the bicycle operating device according to the ninth aspect, it is possible to appropriately position the cable actuator in each of the first position and the second position, and to easily attach a cable to the cable actuator.

In accordance with a tenth aspect of the present disclosure, the bicycle operating device according to the ninth aspect is configured so that the positioning ratchet and the cable holder are separate pieces that are coupled and move together. The positioning ratchet and the cable holder define a cable path therebetween.

With the bicycle operating device according to the tenth aspect, it is possible to easily construct the positioning ratchet and the cable holder.

In accordance with an eleventh aspect of the present disclosure, the bicycle operating device according to the first aspect and any one of the fourth to tenth aspects further comprises a rest position adjuster movably arranged with respect to the base between at least two adjustment positions. The positioning abutment is moved in response to the rest position adjuster being moved.

With the bicycle operating device according to the eleventh aspect, it is possible to improve the operability of the bicycle operating device.

In accordance with a twelfth aspect of the present disclosure, the bicycle operating device according to the eleventh aspect is configured so that the rest position adjuster is pivotally mounted with respect to the base.

With the bicycle operating device according to the twelfth aspect, it is possible to provide a simple adjustment configuration.

In accordance with a thirteenth aspect of the present disclosure, the bicycle operating device according to the eleventh or twelfth aspect is configured so that the rest position adjuster is selectively maintained in the at least two adjustment positions by a detent.

With the bicycle operating device according to the thirteenth aspect, it is possible to prevent inadvertent movement of the rest position adjuster.

In accordance with a fourteenth aspect of the present disclosure, the bicycle operating device according to the first aspect and any one of the fourth to thirteenth aspects is configured so that the user operated input has a first engagement portion selectively abutting the positioning abutment in a state after the user operated input has been moved from the rest position to the operated position to establish the adjusted rest position in a first adjusted rest position while the positioning abutment is in the first abutment position. The user operated input has a second engagement portion selectively abutting the positioning abutment in a state after the user operated input has been moved from the rest position to the operated position to establish the adjusted rest position in a second adjusted rest position while the positioning abutment is in the second abutment position. The first abutment position is different from the second abutment position.

With the bicycle operating device according to the fourteenth aspect, it is possible appropriately positioned the user operated input in the first and second adjusted rest positions.

In accordance with a fifteenth aspect of the present disclosure, the bicycle operating device according to the fourteenth aspect is configured so that the user operated input has a third engagement portion selectively abutting the positioning abutment in a state after the user operated input has been moved from the rest position to the operated position to establish the adjusted rest position in a third adjusted rest position while the positioning abutment is in a third abutment position that different from the first and second abutment positions.

With the bicycle operating device according to the fifteenth aspect, it is possible to improve the operability of the bicycle operating device by providing a third adjusted rest position.

In accordance with a sixteenth aspect of the present disclosure, the bicycle operating device according to any one of the first to fifteenth aspects further comprises a shaft supporting the cable actuator and the user operated input to pivot with respect to the base about a center axis of the shaft.

With the bicycle operating device according to the sixteenth aspect, it is possible to simplify the configuration of the bicycle operating device.

In accordance with a seventeenth aspect of the present disclosure, the bicycle operating device according to the sixteenth aspect is configured so that the user operated input is biased with respect to the base in a direction towards the rest position.

With the bicycle operating device according to the seventeenth aspect, it is possible to simplify the configuration of the bicycle operating device.

In accordance with an eighteenth aspect of the present disclosure, the bicycle operating device according to any one of the first to seventeenth aspects further comprises a housing that accommodates the cable actuator inside the housing.

With the bicycle operating device according to the eighteenth aspect, it is possible to protect the cable actuator inside the housing.

In accordance with a nineteenth aspect of the present disclosure, the bicycle operating device according to the eighteenth aspect further comprises a handlebar attachment coupled to the base.

With the bicycle operating device according to the nineteenth aspect, it is possible to attach the bicycle operating device to a handlebar to improve the operability of the bicycle operating device.

In accordance with a twentieth aspect of the present disclosure, the bicycle operating device according to the eighteenth or nineteenth aspect is configured so that the user operated input includes an attachment portion that is disposed inside the housing and a lever portion that extends outside of the housing from the attachment portion.

With the bicycle operating device according to the twentieth aspect, it is possible to improve the operability of the bicycle operating device by a user while protecting internal parts.

In accordance with a twenty-first aspect of the present disclosure, the bicycle operating device according to the twentieth aspect is configured so that the user operated input further includes a lever plate having first and second engagement portions that selectively abut the positioning abutment in a state after the user operated input has been moved from the rest position to the operated position to establish the adjusted rest position in a first adjusted rest position while the positioning abutment is in the first abutment position, and a second adjusted rest position while the positioning abutment is in the second abutment position. The first abutment position is different from the second abutment position.

With the bicycle operating device according to the twenty-first aspect, it is possible to simplify the configuration of the user operated input.

Also, other objects, features, aspects and advantages of the disclosed bicycle operating device will become apparent to those skilled in the art from the following detailed description, which, taken in conjunction with the annexed drawings, discloses a preferred embodiment of the bicycle operating device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
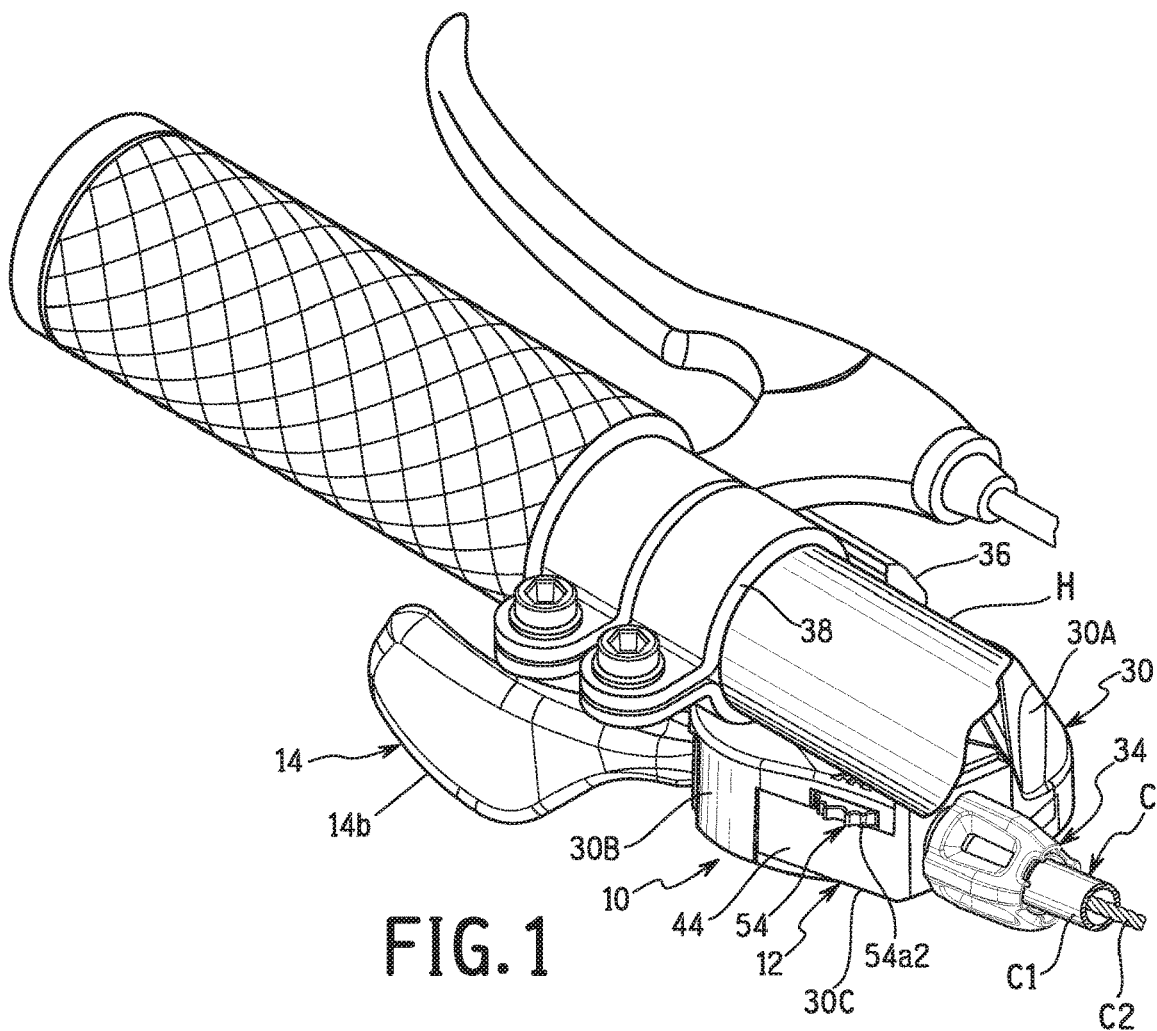
FIG. 1 is a perspective view of a portion of a handlebar of a bicycle equipped with a bicycle operating device in accordance with one illustrative embodiment.
Figure 2:
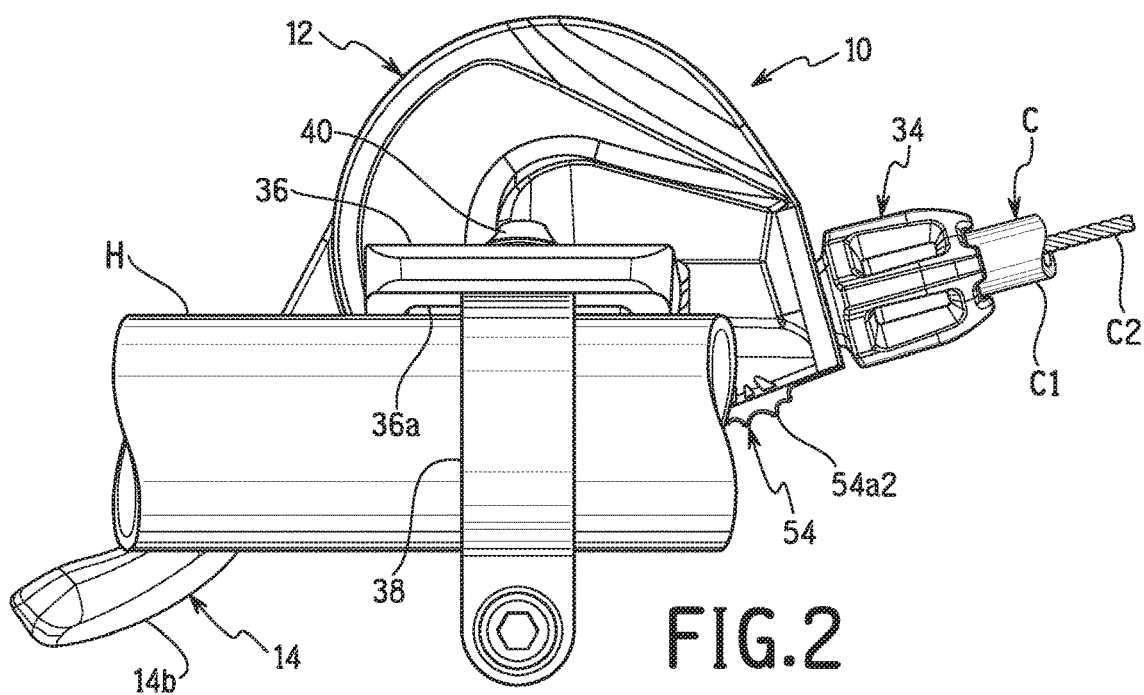
FIG. 2 is a top plan view of the bicycle operating device coupled to the handlebar as illustrated in FIG. 1.

Referring initially to FIGS. 1 and 2, a portion of a handlebar H of a bicycle is shown that is equipped with a bicycle operating device 10 in accordance with one illustrative embodiment. The bicycle operating device 10 is arranged, for example, on a left side of the handlebar H so as to be operated by a rider's left hand. Alternatively, the bicycle operating device 10 can be constructed as a mirror image and arranged on a right side of the handlebar H. The bicycle operating device 10 is adjustably mounted to the handlebar H in a longitudinal direction as explained later.

Figure 4:
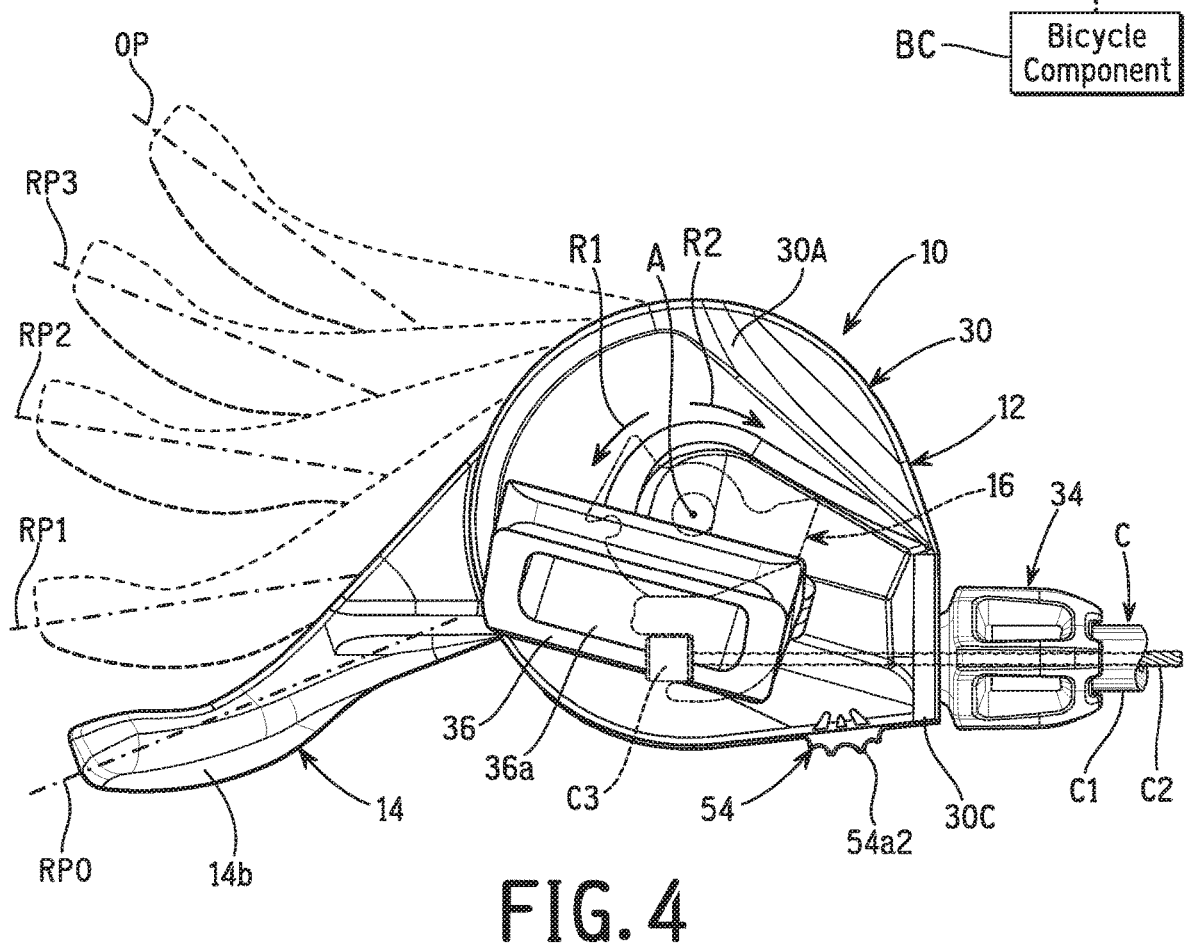
FIG. 4 is a top plan view of the bicycle operating device as illustrated in FIGS. 1 to 3 in which a user operated input of the bicycle operating device is shown in a rest position in solid lines and in which the user operated input is shown in adjusted rest positions or an operated position in broken lines.

In the illustrated embodiment, as seen in FIG. 4, the bicycle operating device 10 is configured to be operatively coupled to a bicycle component BC via a control cable C. In the illustrated embodiment, the bicycle operating device 10 is configured as a gear shifter for controlling a gear position of a gear changing device such as a derailleur or an internally geared hub. However, the bicycle component operating device 10 can be used as a bicycle control device for operating other types of bicycle components (e.g., a suspension, an adjustable seatpost, etc.) as needed and/or desired.

Figure 3:
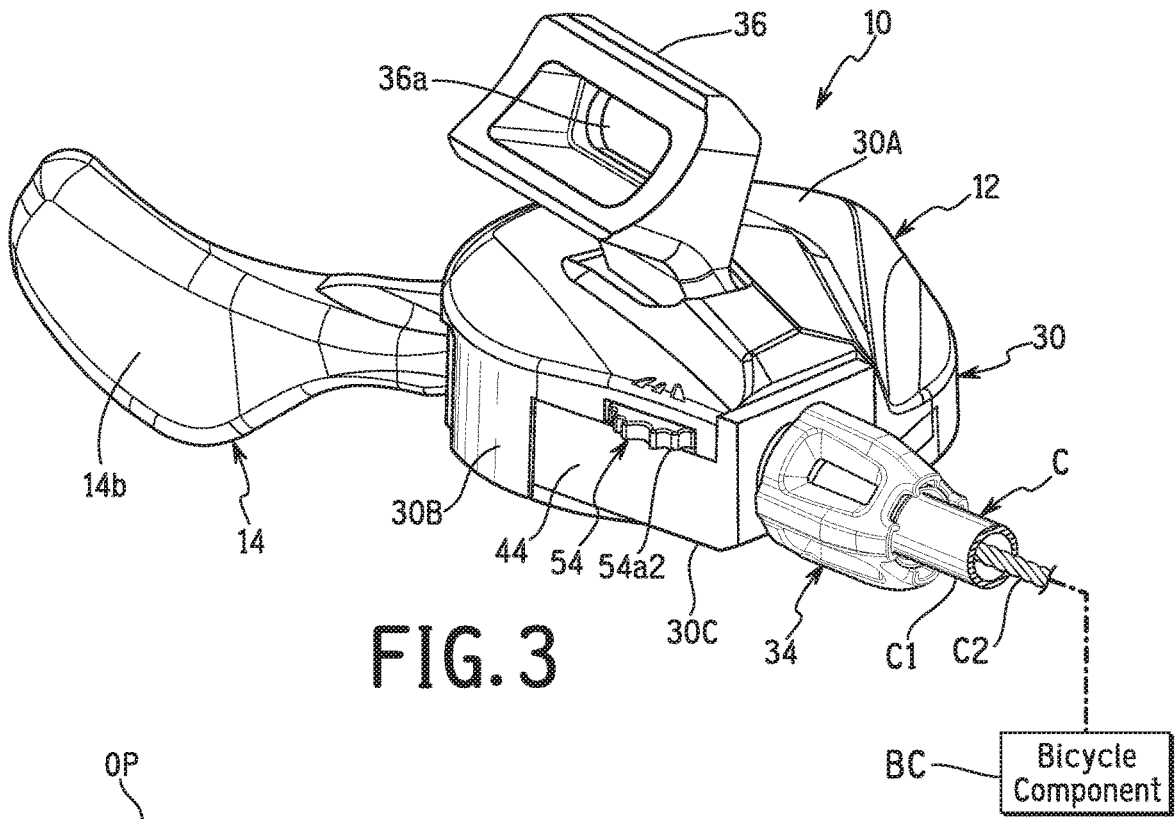
FIG. 3 is a perspective view of the bicycle operating device illustrated in FIGS. 1 and 2 in which the bicycle operating device is operatively coupled to a bicycle component via a cable.

Preferably, as seen in FIG. 3, the control cable C is a conventional bicycle operating cable that has an outer case C1 covering an inner wire C2. In other words, the control cable C is a Bowden type cable in which the inner wire C2 is slidably received within the outer case C1. The inner wire C2 has a cable nipple or attachment barrel C3 for attaching the inner wire C2 to the bicycle component operating device 10 as discussed below. The bicycle component operating device 10 operates the bicycle component BC by selectively pulling and releasing the inner wire C2.

Figure 5:
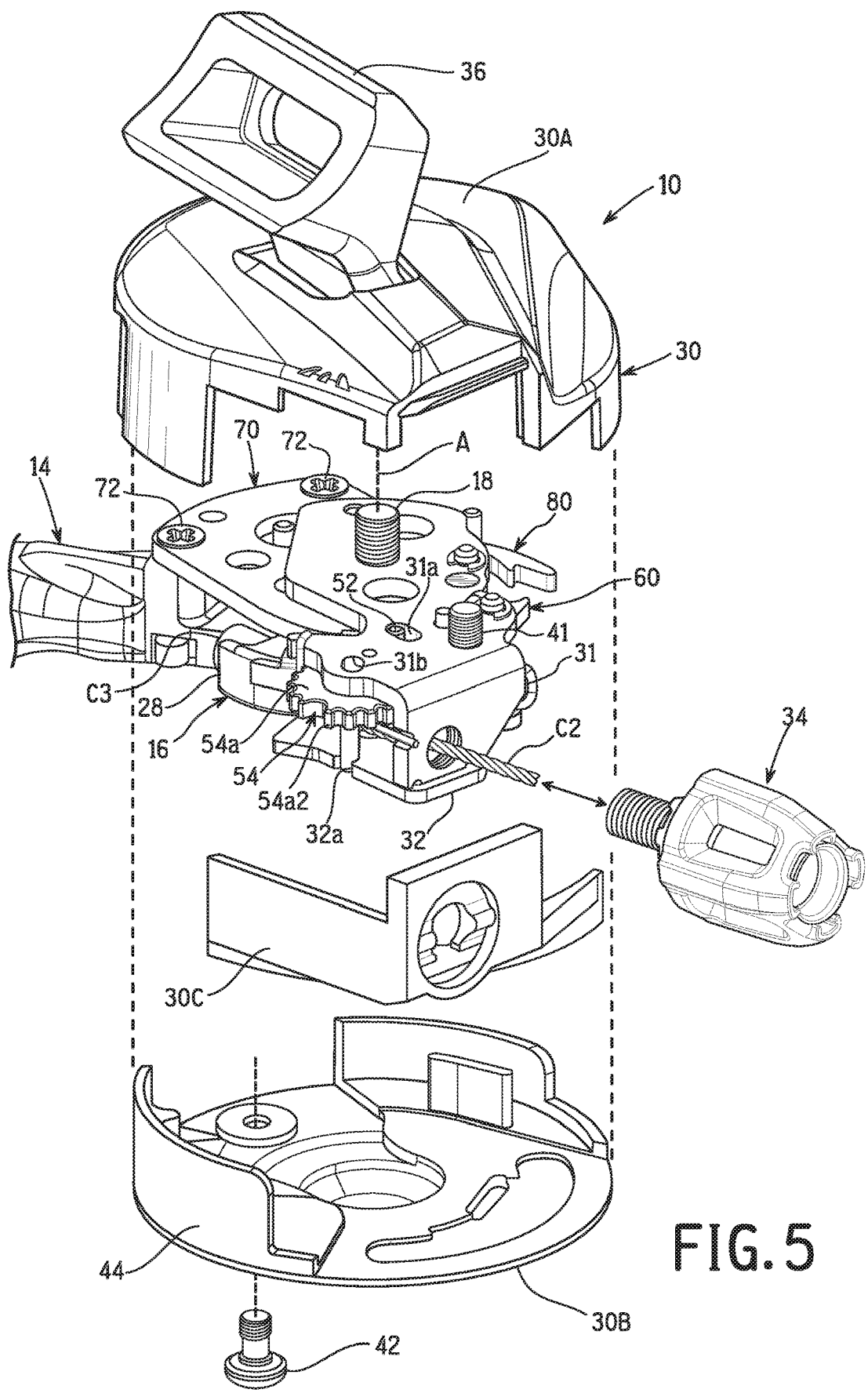
FIG. 5 is a partially exploded perspective view of the bicycle operating device illustrated in FIGS. 1 to 4.

Referring to FIGS. 4 and 5, the bicycle operating device 10 basically comprises a base 12, a user operated input 14 and a cable actuator 16. Basically, the user operated input 14 is movably arranged with respect to the base 12 from a rest position RP0 towards an operated position OP. The attachment barrel C3 of the inner wire C2 is attached to the cable actuator 16. As a result of the operation of the user operated input 14, the cable actuator 16 is moved to release or pull the inner wire C2 with respect to the base 12.

In the illustrated embodiment, as seen in FIG. 3, the user operated input 14 has at least two different rest positions. In any case, the term "rest position" as used herein refers to a state in which a part (e.g., the user operated input 14) remains stationary without the need of a user holding the part in that state. As explained later, the user operated input 14 has a first rest position and at least one second rest position. The first rest position will hereafter be referred to simply as the rest position RP0, while the second rest position will hereafter be referred to simply as one of the adjusted rest positions RP1, RP2 or RP3. In the illustrated embodiment, the rest position RP0 corresponds to when the cable actuator 16 is in a fully released position (e.g., a low position in the case of a front derailleur) and the adjusted rest positions RP1, RP2 or RP3 corresponds to when the cable actuator 16 is in a pulled position (e.g., a top position in the case of a front derailleur that is fully pulled).

Basically, the cable actuator 16 is connected to the inner wire C2 of the control cable C of the bicycle component BC (FIG. 3). As explained later, the bicycle operating device 10 is configured to pull the inner wire C2 with respect to the base 12 in response to a cable pulling operation of the user operated input 14 and releases the inner wire C2 with respect to the base 12 in response to a cable releasing operation of the user operated input 14. Thus, the bicycle operating device 10 constitutes a bicycle cable operating device.

Figure 6:
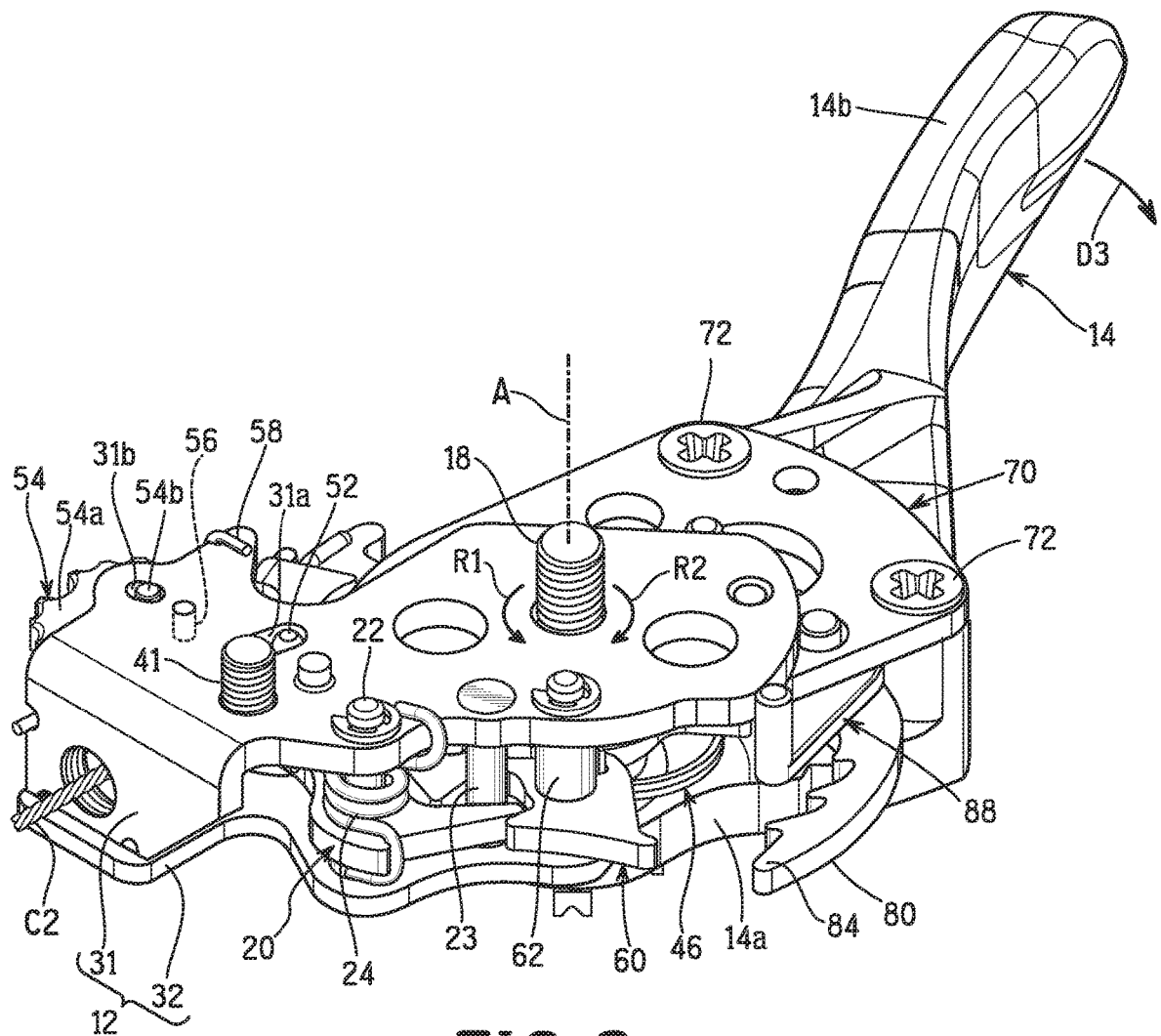
FIG. 6 is a perspective view of selected parts of the bicycle operating device illustrated in FIGS. 1 to 5.
Figure 7:
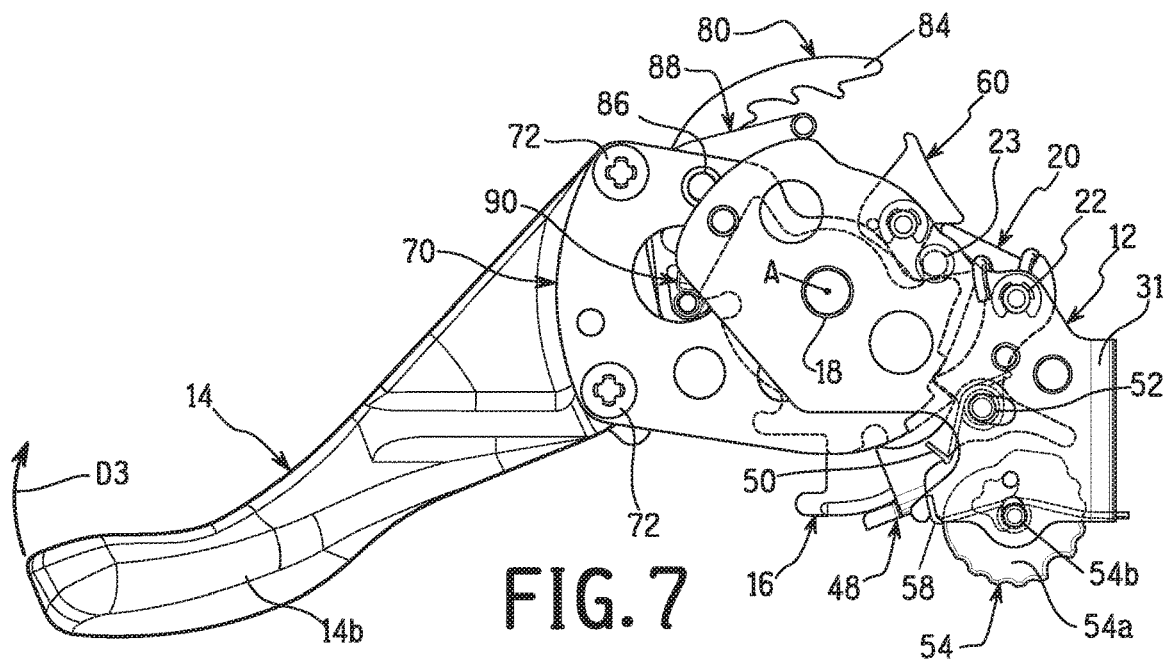
FIG. 7 is a top plan view of the selected parts shown in FIG. 6 in which the user operated input of the bicycle operating device is maintained in the rest position.

As seen in FIGS. 6 to 13, the cable actuator 16 is movably arranged with respect to the base 12 in response to movement of the user operated input 14. In particular, the cable actuator 16 is movably arranged with respect to the base 12 in response to movement of the user operated input 14 between at least first and second cable holding positions. In other words, the user operated input 14 is operated by a user to move the cable actuator 16 between the first and second cable holding positions, which in turn either pull or release the inner wire C2 of the control cable C with respect to the base 12. The first cable holding position of the cable actuator 16 is shown in FIGS. 6 and 7. In the first cable holding position of the cable actuator 16, the inner wire C2 of the control cable C is fully released with respect to the base 12. The second cable holding position of the cable actuator 16 is shown in FIGS. 8 to 13. In the second cable holding position of the cable actuator 16, the inner wire C2 of the control cable C is fully pulled with respect to the base 12.

Figure 14:
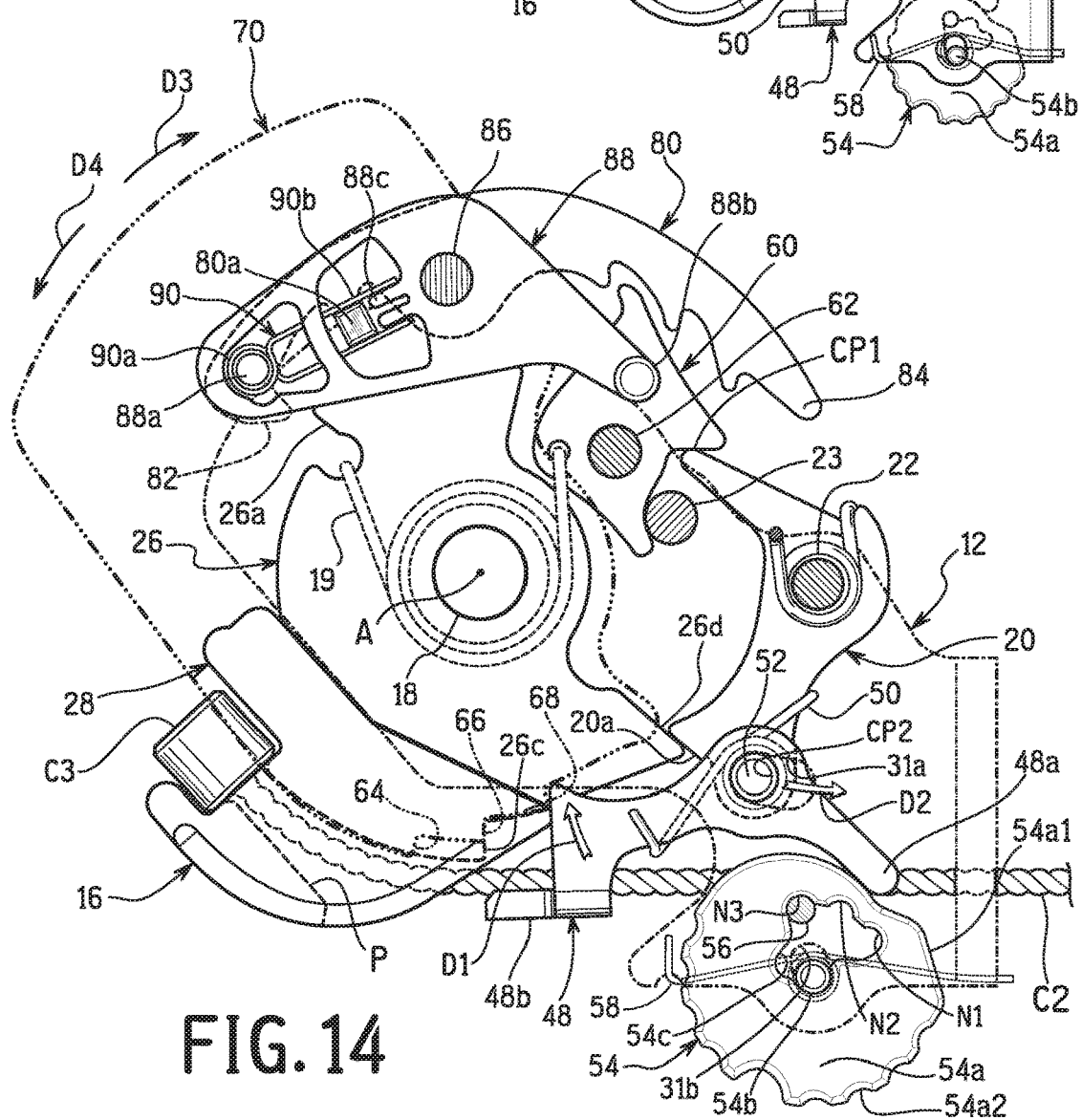
FIG. 14 is an enlarged top plan view of certain parts of the selected parts shown in FIG. 13 in which the user operated input of the bicycle operating device is maintained in the third adjusted rest position.
Figure 15:
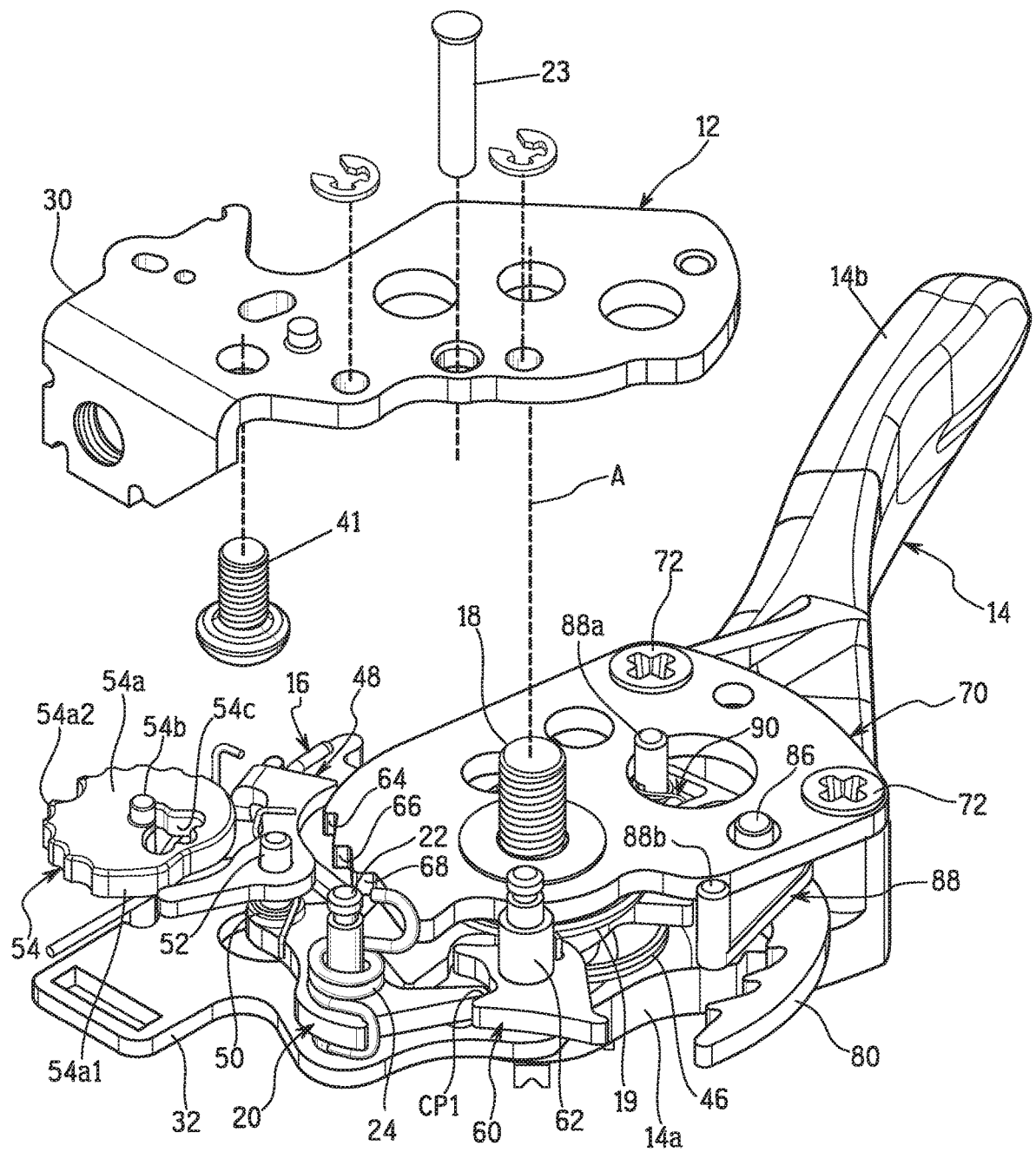
FIG. 15 is a partially exploded perspective view of the selected parts shown in FIG. 6 of the bicycle operating device illustrated in FIGS. 1 to 5.
Figure 16:
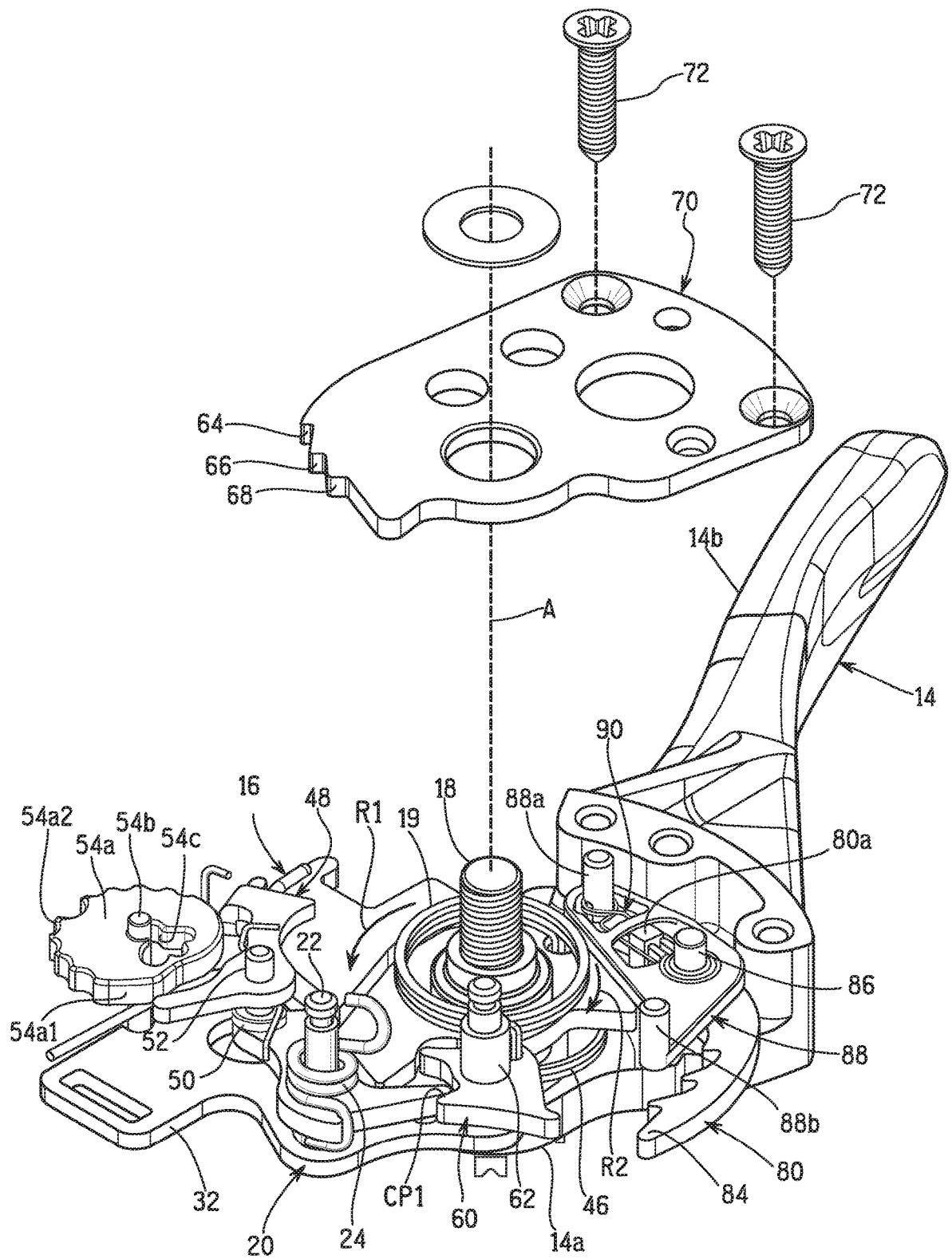
FIG. 16 is a partially exploded perspective view of selected parts of the bicycle operating device illustrated in FIGS. 1 to 5.

As seen in FIGS. 5, 14 and 15, the bicycle operating device 10 further comprises a shaft 18 that supports the cable actuator 16 and the user operated input 14 to pivot with respect to the base 12 about a center axis A of the shaft 18. In this way, the shaft 18 acts as a pivot shaft or axle for pivotally support the user operated input 14 and the cable actuator 16 with respect to the base 12. Thus, the cable actuator 16 moves between the first and second cable holding positions about the center axis A of the shaft 18.

As seen in FIG. 4, the cable actuator 16 moves in a cable releasing direction R1 in response to the user operated input 14 being operated from the rest position RP0 towards the operated position OP. On the other hand, as explained later, the cable actuator 16 moves in a cable pulling direction R2 in response to the user operated input 14 being operated from one of the adjusted rest positions RP1, RP2 or RP3 towards either the operated position OP or the rest position RP0. Thus, the rest position RP0 can also be considered an operated position with respect to the adjusted rest positions RP1, RP2 or RP3 when the user operated input 14 is operated from one of the adjusted rest positions RP1, RP2 or RP3 towards the rest position RP0.

Figure 8:
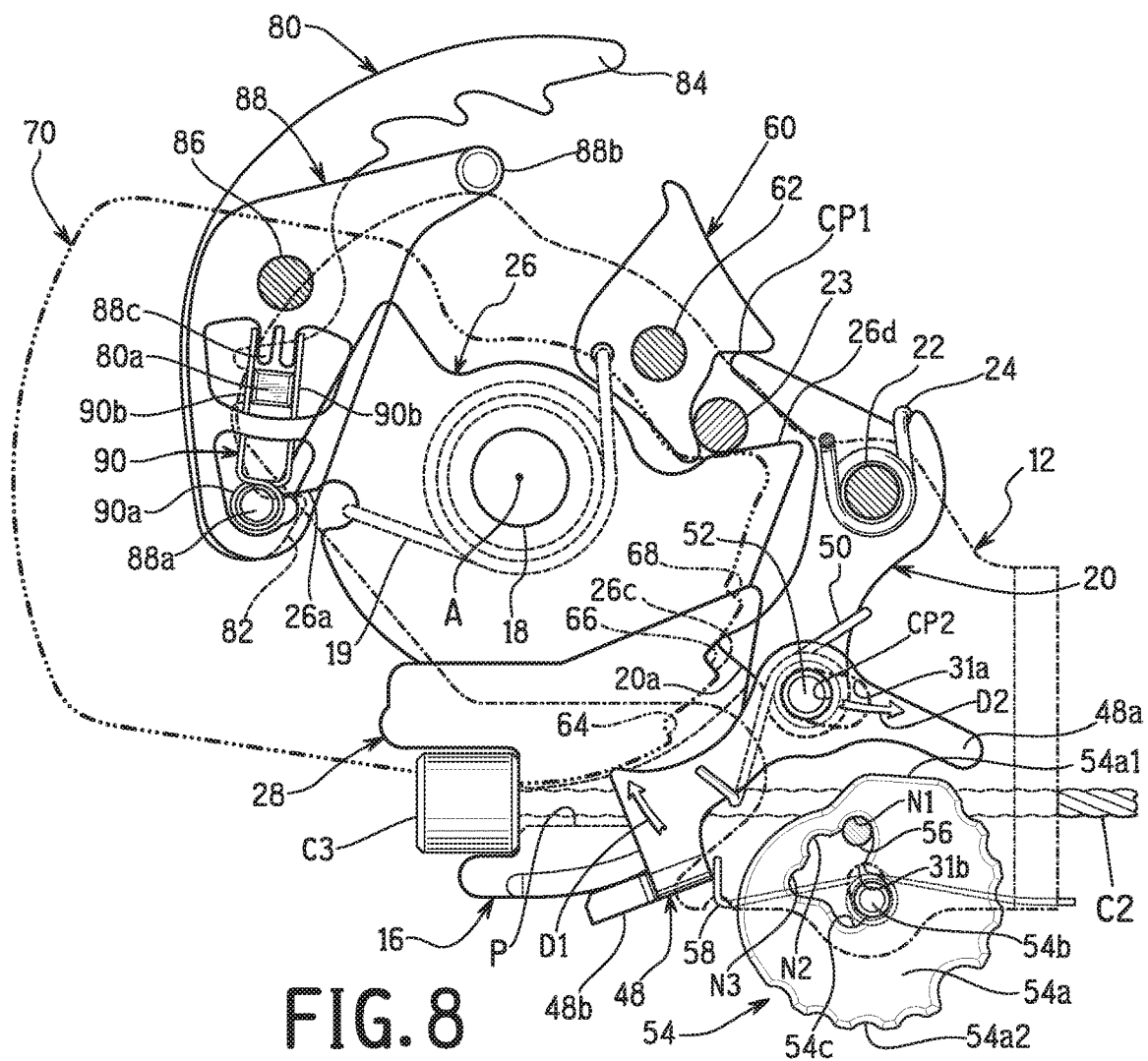
FIG. 8 is an enlarged top plan view of certain parts of the selected parts shown in FIG. 7 in which the user operated input of the bicycle operating device is maintained in the rest position.

In the illustrated embodiment, as seen in FIG. 8, a biasing element 19 (e.g., a spring) is provided for biasing the cable actuator 16 in the cable releasing direction R1 towards the first cable holding position. Thus, when the cable actuator 16 is released, as explained below, the cable actuator 16 moves in the cable releasing direction R1 under the biasing force of the biasing element 19.

Referring in FIGS. 7 and 9, the establishment of the first and second cable holding positions of the cable actuator 16 will now be discussed. Here, the bicycle operating device 10 further comprises a positioning catch 20 that is movably arranged with respect to the base 12. For example, in the illustrated embodiment, the positioning catch 20 is pivotally mounted on the base 12 by a pivot pin 22. Basically, the cable actuator 16 is selectively maintained in each of the first and second cable holding positions by the positioning catch 20. However, the base 12 also includes a stop pin 23 that contacts the cable actuator 16 in the first cable holding position such that the positioning catch 20 does not need to be used to maintain the cable actuator 16 in the first cable holding position. The stop pin 23 also limits the pivotal movement of the positioning catch 20 away from the cable actuator 16.

In any case, in the illustrated embodiment, the positioning catch 20 has a positioning position and a release position, which differs from the positioning position. In the positioning position, the positioning catch 20 is engaged with the cable actuator 16 to prevent movement of the cable actuator 16 in the cable releasing direction R1. However, in the positioning position, the positioning catch 20 does not prevent movement of the cable actuator 16 in the cable pulling direction R2. In the release position, the positioning catch 20 is disengaged from the cable actuator 16 to permit movement of the cable actuator 16 in the cable releasing direction R1.

The positioning catch 20 is biased towards the positioning position by a biasing element 24 (e.g., a spring). Here, the biasing element 24 is a torsion spring having a coiled portion mounted on the pivot pin 22, a first end engaged with the positioning catch 20, and a second end engaged with the base 12. The positioning catch 20 includes an abutment 20a that engages the positioning catch 20 while the positioning catch 20 is in the positioning position. The positioning catch 20 has a first contact point CP1 and a second contact point CP2. The positioning catch 20 receives a moving force at the first contact point CP1 or the second contact point CP2 to moves the positioning catch 20 from the positioning position to the release position in response to operation of the user operated input 14 as explained below. In this way, operation of the user operated input 14 causes a force to act on one of the first and second contact points CP1 and CP2 of the positioning catch 20, which in turn moves the positioning catch 20 from the positioning position to the release position so that the cable actuator 16 can be released during a cable releasing operation.

Figure 17:
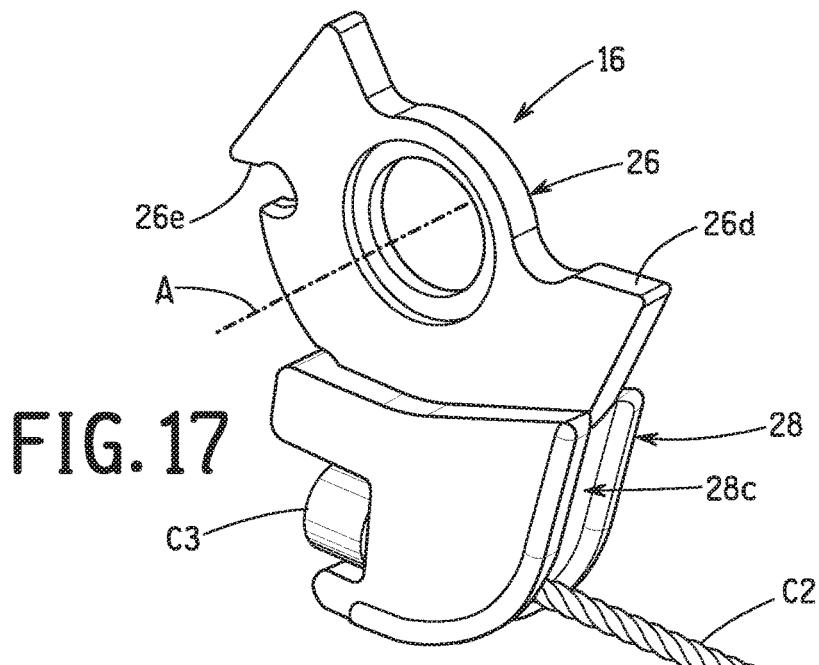
FIG. 17 is a perspective view of a cable actuator of the bicycle operating device illustrated in FIGS. 1 to 5 in which a control cable is coupled to the cable actuator.
Figure 18:
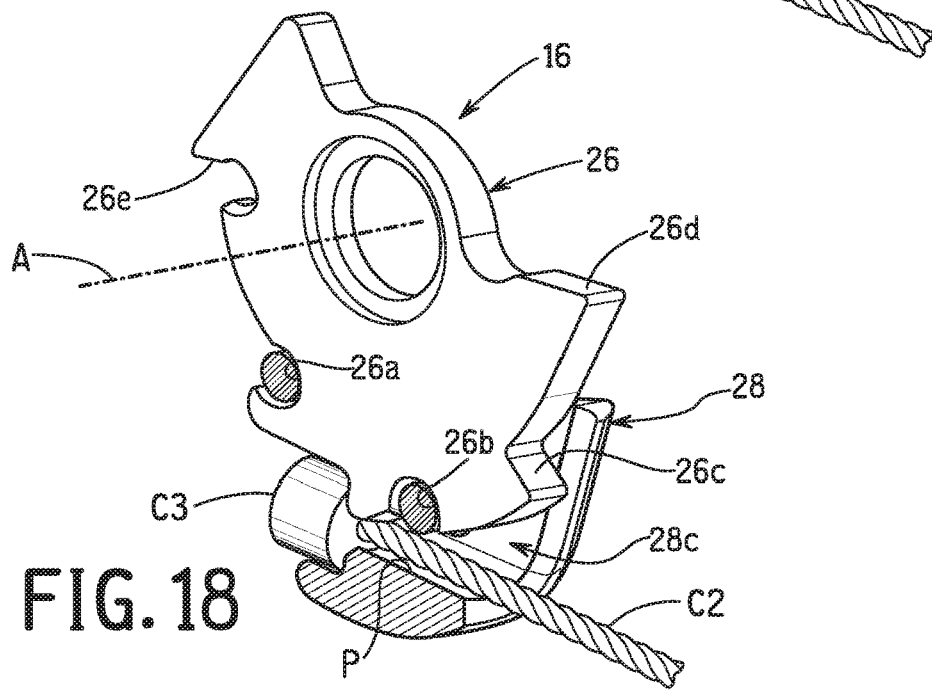
FIG. 18 is a perspective view of the cable actuator illustrated in FIG. 17 in which a portion of a cable holder of the cable actuator is broken away.

As seen in FIGS. 8 and 17 to 19, here, the cable actuator 16 includes a positioning ratchet 26 and a cable holder 28. The positioning ratchet 26 and the cable holder 28 are coupled and move together. Thus, the positioning catch 20, the positioning ratchet 26 and the cable holder 28 form a cable position maintaining mechanism of the bicycle operating device 10. As seen in FIG. 18, the positioning ratchet 26 and the cable holder 28 define a cable path P therebetween. The term "therebetween" with respect to two parts (e.g., the positioning ratchet 26 and the cable holder 28) as used herein refers to a space disposed directly between the two adjacent parts without any intervening parts.

In the illustrated embodiment, the positioning ratchet 26 and the cable holder 28 are separate pieces that are coupled and move together. In this way, the inner wire C2 can be easily attached to the positioning ratchet 26 by the cable holder 28. Also, the positioning ratchet 26 and the cable holder 28 can be made of different materials such as the positioning ratchet 26 being made of a rigid metallic material and the cable holder 28 being made of a rigid non-metallic material. Here, the cable holder 28 is snap-fitted to the positioning ratchet 26.

Figure 19:
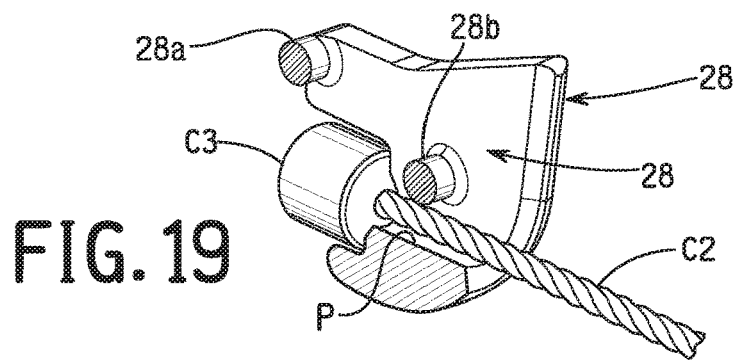
FIG. 19 is a perspective view of the portion of the cable holder of the cable actuator illustrated in FIG. 18 which a portion of the cable holder is broken away and in which a positioning ratchet of the cable actuator has been removed.

Specifically, as seen in FIGS. 17 to 19, the positioning ratchet 26 includes a first recess 26a and a second recess 26b that are formed in the peripheral edge of the positioning ratchet 26, while the cable holder 28 includes a first pin 28a and a second pin 28b that are located in a slot 28c. To couple the cable holder 28 to the positioning ratchet 26, the peripheral edge of the positioning ratchet 26 is inserted into the slot 28c of the cable holder 28 so that the first pin 28a is hooked in the first recess 26a. Then, the cable holder 28 is pivoted on the first pin 28a that is hooked in the first recess 26a such that the second pin 28b is snap-fitted into the second recess 26b.

The positioning ratchet 26 includes a first stop 26c and a second stop 26d. The first and second stops 26c and 26d selectively contacts the abutment 20a of the positioning catch 20 to establish the first and second cable holding positions of the cable actuator 16. More specifically, the first stop 26c contacts the abutment 20a of the positioning catch 20 to establish the first cable holding position of the cable actuator 16. On the other hand, the second stop 26d contacts the abutment 20a of the positioning catch 20 to establish the second cable holding position of the cable actuator 16. In the illustrated embodiment, the second stop 26d also contacts the stop pin 23 to establish the first cable holding position of the cable actuator 16. The positioning ratchet 26 includes a pulling abutment 26e that is used for rotating the cable actuator 16 in the cable pulling direction R2 as explained later.

Referring back to FIGS. 4 and 5, the bicycle operating device 10 further comprises a housing 30 that accommodates the cable actuator 16 inside the housing 30. The base 12 movably supports the cable actuator 16 inside the housing 30. In other words, the cable actuator 16 is disposed in the housing 30. The base 12 supports the housing 30. The base 12 includes a first internal support 31 and a second internal support 32 that support various internal parts inside the housing 30. The cable actuator 16 is pivotally mounted on the shaft 18 between the first and second internal supports 31 and 32. The first internal support 31 also supports a barrel adjuster 34 that projects outside of the housing 30. The barrel adjuster 34 is adjustably coupled to the first internal support 31 to variably fix a contact point of an end of the outer case C1 relative to the base 12.

Referring back to FIGS. 2 to 5, the bicycle operating device 10 further comprises a handlebar attachment 36 coupled to the housing 30. Here, the housing 30 and the handlebar attachment 36 are separate members that are attached together via the internal support 32. In particular, the shaft 18 is a bolt that extends upwardly through the internal support 32, and that is threaded into the handlebar attachment 36 for attaching the handlebar attachment 36 to a part of the housing 30 and the internal support 32. However, the handlebar attachment 36 can be integrally form with a part of the housing 30 as a one-piece member as needed and/or desired. Also, the handlebar attachment 36 can be adjustably mounted to the housing 14 as needed and/or desired. Here, the handlebar attachment 36 has an elongated attachment opening 36a for attachment to a handlebar clamp 38 using a bolt 40 as seen in FIG. 2. The handlebar attachment 36 is preferably made of a strong rigid material such as a metallic material or a reinforced resin material.

The housing 30 covers the internal parts (see FIG. 5) of the bicycle operating device 10 that release from the inner wire C2 to feed out of the housing 30 and that pull the inner wire C2 into the housing 30. Here, for example, the housing 30 has a three-piece construction. Specifically, the housing 30 includes an upper housing part 30A, a lower housing part 30B and a side housing part 30C. The housing parts 30A, 30B and 30C are hard rigid members constructed of a suitable material such as a hard plastic or a lightweight metal such as aluminum. However, the housing 14 can have a variety of configurations as needed and/or desired.

The upper housing part 30A is sandwiched between the internal support 32 and the handlebar attachment 36 upon fastening the shaft 18 to the handlebar attachment 36. Also, an additional bolt 41 secures the handlebar attachment 36 to the first internal support 31. The lower housing part 30B is attached to the user operated input 14 by a screw 42. Thus, the lower housing part 30B moves with the user operated input 14 relative to the upper housing part 30A and the side housing part 30C. The side housing part 30C is hooked onto the housing part 30A and sandwiched between the upper housing part 30A and the internal support 32. In this way, the upper housing part 30A and the side housing part 30C are fixed to the base 12 and can be considered to be a part of the base 12. While the lower housing part 30B moves with the user operated input 14, the lower housing part 30B could be fixed to the upper housing part 30A and the side housing part 30C if need and/or desired. Here, the housing 30 has a sidewall 44. In the illustrated embodiment, the sidewall 44 is partially defined be each of the upper housing part 30A, the lower housing part 30B and the side housing part 30C.

Referring to FIG. 6, the user operated input 14 includes an attachment portion 14a that is disposed inside the housing 30 and a lever portion 14b that extends outside of the housing 30 from the attachment portion. The attachment portion 14a is pivotally attached to the shaft 18. The lever portion 14b is arranged such that the user moves the lever portion 14b to pivot the user operated input 14 about the shaft 18.

The user operated input 14 is biased with respect to the base 12 in a direction towards the rest position RP0. As seen in FIG. 6, a biasing element 46 (e.g., a spring) is provided for biasing the user operated input 14 towards the rest position RP0. In this way, when the user operated input 14 is released after being moved from one of the rest positions RP0, RP1, RP2 or RP3 to the operated position OP, the user operated input 14 automatically returns to one of the rest positions RP0, RP1, RP2 or RP3 once the user operated input 14 is released by the user. Basically, here, the biasing element 46 is a torsion spring having a coiled portion mounted on the shaft 18, a first end engaged with the user operated input 14, and a second end engaged with the base 12.

As the user operated input 14 is moved from the rest position RP0 towards the operated position OP, the cable actuator 16 is moved to pull the inner wire C2 of the control cable C with respect to the base 12. To prevent the user operated input 14 from returning to one the rest position RP0, the bicycle operating device 10 further comprises a positioning abutment 48. The positioning abutment 48 selectively engages the user operated input 14 to position the user operated input 14 at an adjusted rest position RP1, RP2 or RP3 in a state after the user operated input 14 has been moved from the rest position RP0 to the operated position OP. The adjusted rest position RP1, RP2 or RP3 is different from the rest position RP0. In other words, the user operated input 14 stops the user operated input 14 from returning to the rest position RP0 and establishes the adjusted rest position RP1, RP2 or RP3.

The positioning abutment 48 is biased towards engagement with the user operated input 14 by a biasing element 50. The positioning abutment 48 is movably supported on the base 12 between at least a first abutment position and a second abutment position. In the illustrated embodiment, the positioning abutment 48 is pivotally mounted on a pivot pin 52 that is mounted on the positioning catch 20. A portion of the pivot pin 52 is disposed in a control opening 31a in the first internal support 31 of the base 12. In this way, the positioning abutment 48 is pivotally arranged with respect to the base 12 in a first direction D1 and slidably arranged with respect to the base 12 in a second direction D2 that is different from the first direction D1. The positioning abutment 48 is arranged to move the positioning catch 20 as the positioning abutment 48 moves in the second direction D2. The biasing element 50 is a torsion spring having a coiled portion mounted on the pivot pin 52, a first end engaged with the positioning abutment 48, and a second end engaged with the positioning catch 20. The biasing element 50 applies a biasing force to urge the positioning abutment 48 towards engagement with the user operated input 14 as discussed below. In the illustrated embodiment, the positioning abutment 48 includes a first control part 48a and a second control part 48b. As explained below, the first control part 48a is restrained to establish the adjusted rest positions RP1, RP2 and RP3. As explained below, the second control part 48b is configured to temporarily restrain the movement of the cable actuator 16 in the cable releasing direction R1.

In the illustrated embodiment, as seen in FIGS. 7 to 14, the adjusted rest positions RP1, RP2 and RP3 of the user operated input 14 is adjustable. Here, the bicycle operating device 10 further comprises a rest position adjuster 54. The rest position adjuster 54 is movably arranged with respect to the base 12 to selectively adjust the adjusted rest position RP1, RP2 or RP3 of the user operated input 14 in a state after the user operated input 14 has been moved from the rest position RP0 to the operated position OP. The rest position adjuster 54 is movably arranged with respect to the base 12 between at least two adjustment positions. For example, the rest position adjuster 54 is pivotally mounted with respect to the base 12.

Basically, as seen in FIGS. 7 to 14, the positioning abutment 48 is moved in response to the rest position adjuster 54 being moved. In this way, the adjusted rest position of the user operated input 14 is adjusted. Here, the rest position adjuster 54 is an adjustment dial or wheel that is turned by a user or rider. In the illustrated embodiment, the rest position adjuster 54 includes a dial 54a and a shaft 54b. The dial 54a of rest position adjuster 54 includes a cam surface 54a1 that restricts the movement of the first control part 48a of the positioning abutment 48 to establish the adjusted rest positions RP1, RP2 and RP3. The dial 54a of rest position adjuster 54 further includes a part 54a2 for the user to turn the dial 54a. The part 54a2 of the rest position adjuster 54 extends outside of the sidewall 44 of the housing 30. More specifically, the part 54a2 of the rest position adjuster 54 extends in a radial direction with respect to the shaft 54b beyond the sidewall 44 of the housing 30. For example, the shaft 54b of the rest position adjuster 54 is parallel to the shaft 18 that supports the cable actuator 16. In this way, the adjusted rest position RP1, RP2 or RP3 of the user operated input 14 can be adjusted without disassembling any parts of the bicycle operating device 10. Moreover, a rider can adjust the adjusted rest position RP1, RP2 or RP3 of the user operated input 14 while riding a bicycle in which the bicycle operating device 10 is installed.

As seen in FIG. 5, the opposite ends of the shaft 54b are disposed in opposed openings 31b and 32a in the first and second internal supports 31 and 32. The shaft 54b defines a pivot axis of the rest position adjuster 54 such that the dial 54a pivots relative to the base 12. The rest position adjuster 54 is selectively maintained in the at least two adjustment positions by a detent 56. Here, the detent 56 extends from the first internal support 31 of the base 12 into an opening 54c of the rest position adjuster 54. In the illustrated embodiment, the rest position adjuster 54 has three adjustment positions. Thus, the opening 54c has three notches N1, N2 and N3 that are selectively engaged by the detent 56 upon turning the rest position adjuster 54 relative to the base 12.

Figure 20:
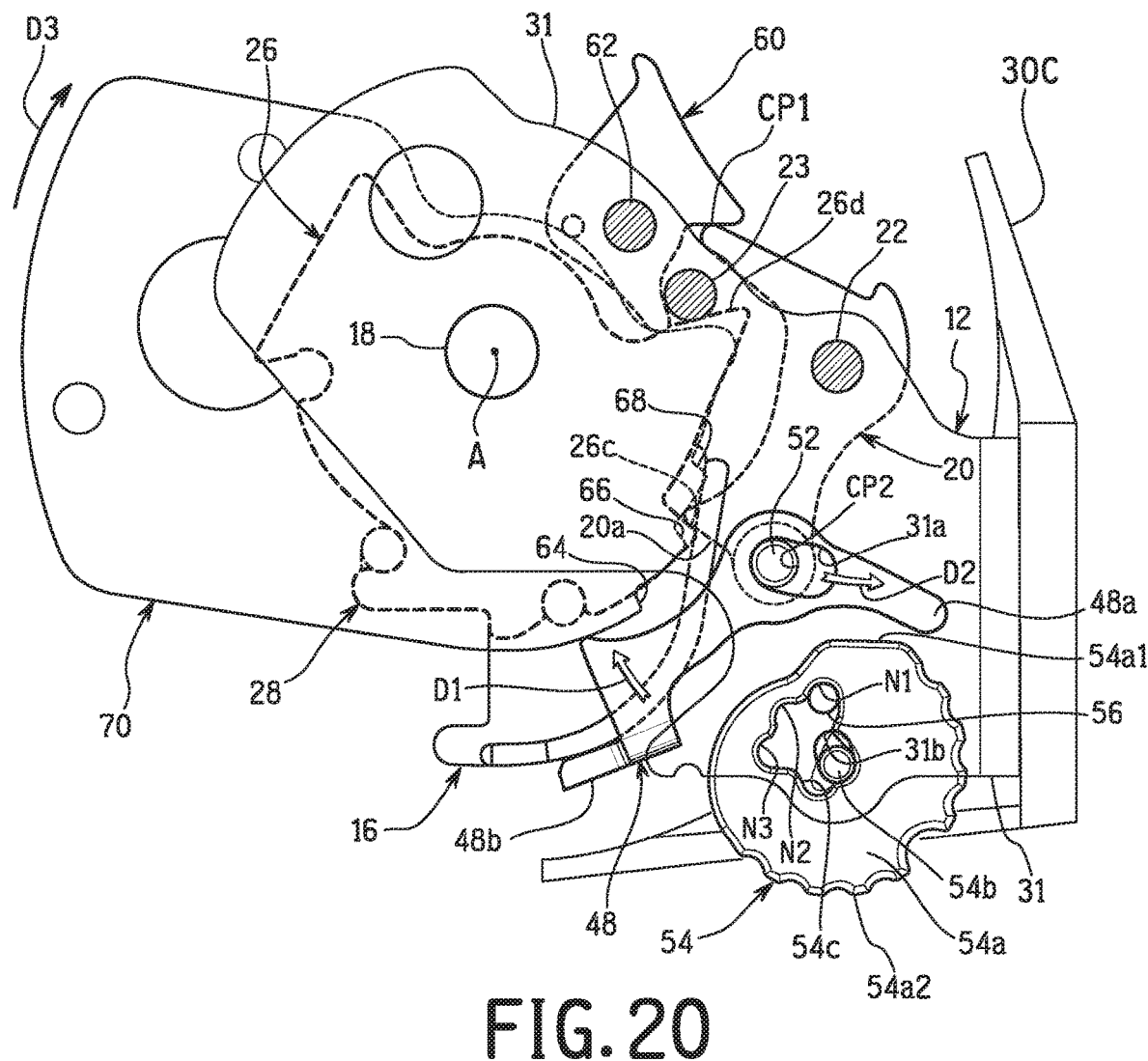
FIG. 20 is an enlarged top plan view of selected parts of the bicycle operating device illustrated in FIGS. 1 to 5 in which a rest position adjuster is in disposed in a first adjustment position.
Figure 21:
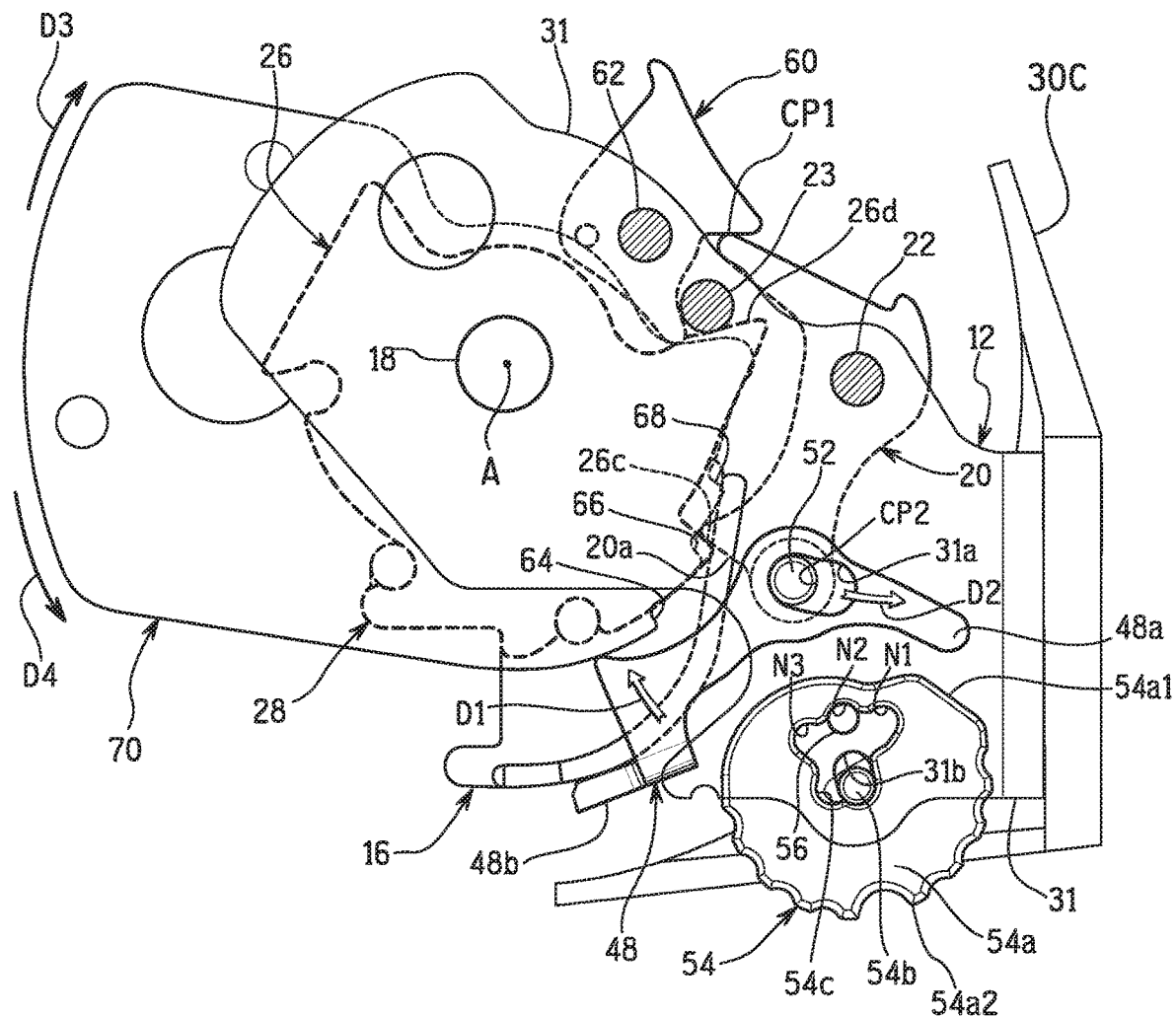
FIG. 21 is an enlarged top plan view of the selected parts shown in FIG. 20 of the bicycle operating device in which the rest position adjuster is in disposed in a second adjustment position.
Figure 22:
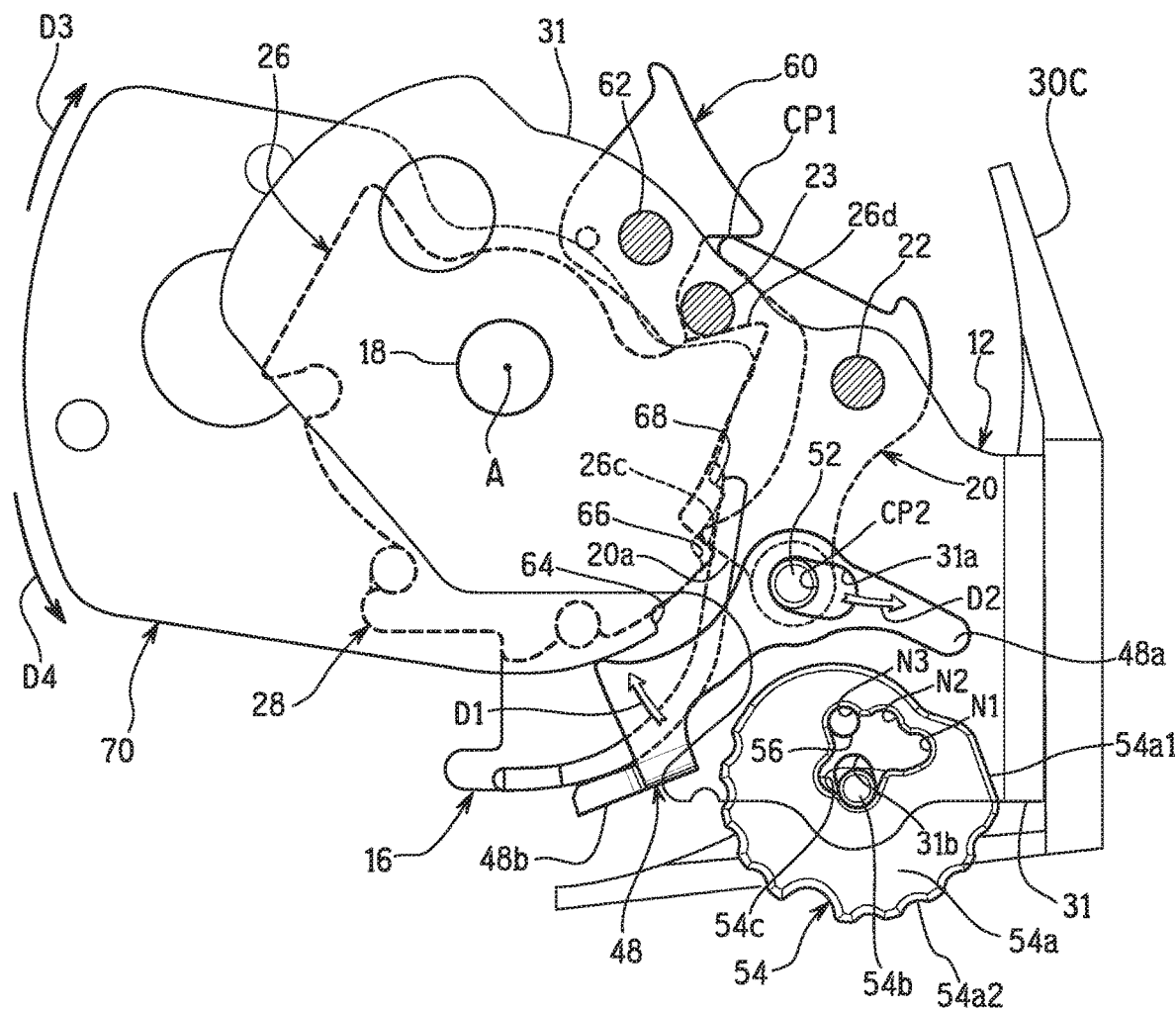
FIG. 22 is an enlarged top plan view of the selected parts shown in FIGS. 20 and 21 of the bicycle operating device in which the rest position adjuster is in disposed in a third adjustment position.

As seen in FIGS. 20 to 21, when the user operated input 14 is in the rest position RP0, the rest position adjuster 54 is inactivate and the first control part 48a of the positioning abutment 48 is spaced from the cam surface 54a1. In particular, the second control part 48b of the positioning abutment 48 contacts the cable holder 28 of the cable actuator 16 and a part (discussed below) of the user operated input 14 to prevent the positioning abutment 48 from pivoting into contact with the cam surface 54a1. In this way, the first control part 48a of the positioning abutment 48 is spaced from the cam surface 54a1 when the user operated input 14 is in the rest position RP0. As seen in FIGS. 20 to 21, the rest position adjuster 54 is inactivate in each of the first, second and third positions of the rest position adjuster 54. Also, the second control part 48b of the positioning abutment 48 contacts the cable holder 28 of the cable actuator 16 and a part of the user operated input 14 to prevent the positioning abutment 48 from engaging engagement portions 64, 66 and 68 of the user operated input 14 (discussed below).

Figure 9:
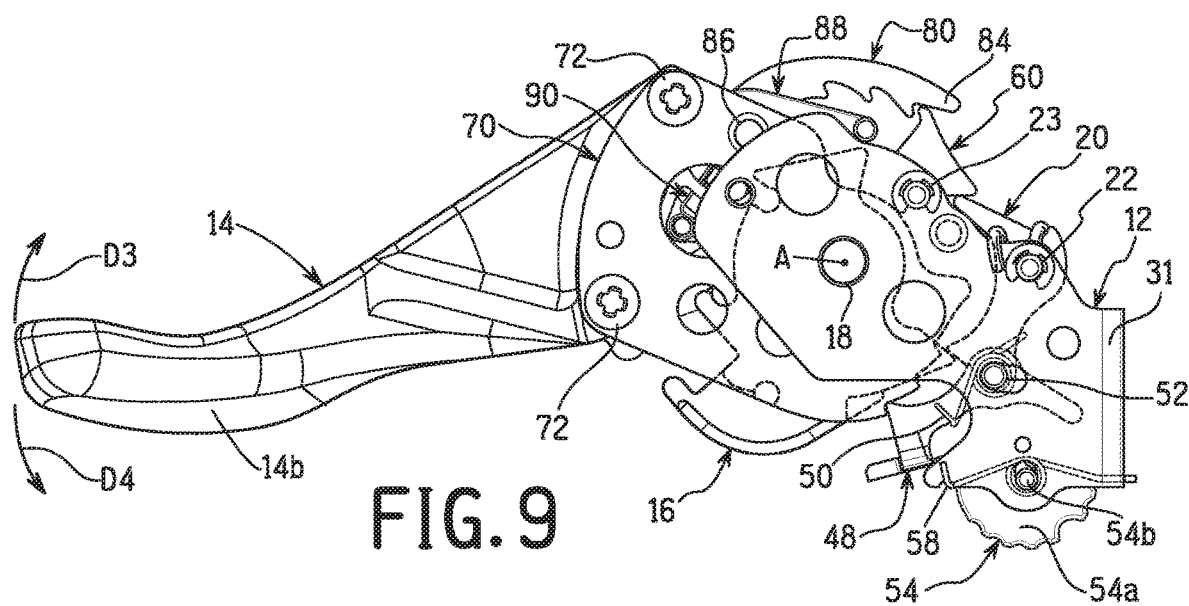
FIG. 9 is a top plan view of the selected parts shown in FIG. 6 in which the user operated input of the bicycle operating device is maintained in a first adjusted rest position.
Figure 10:
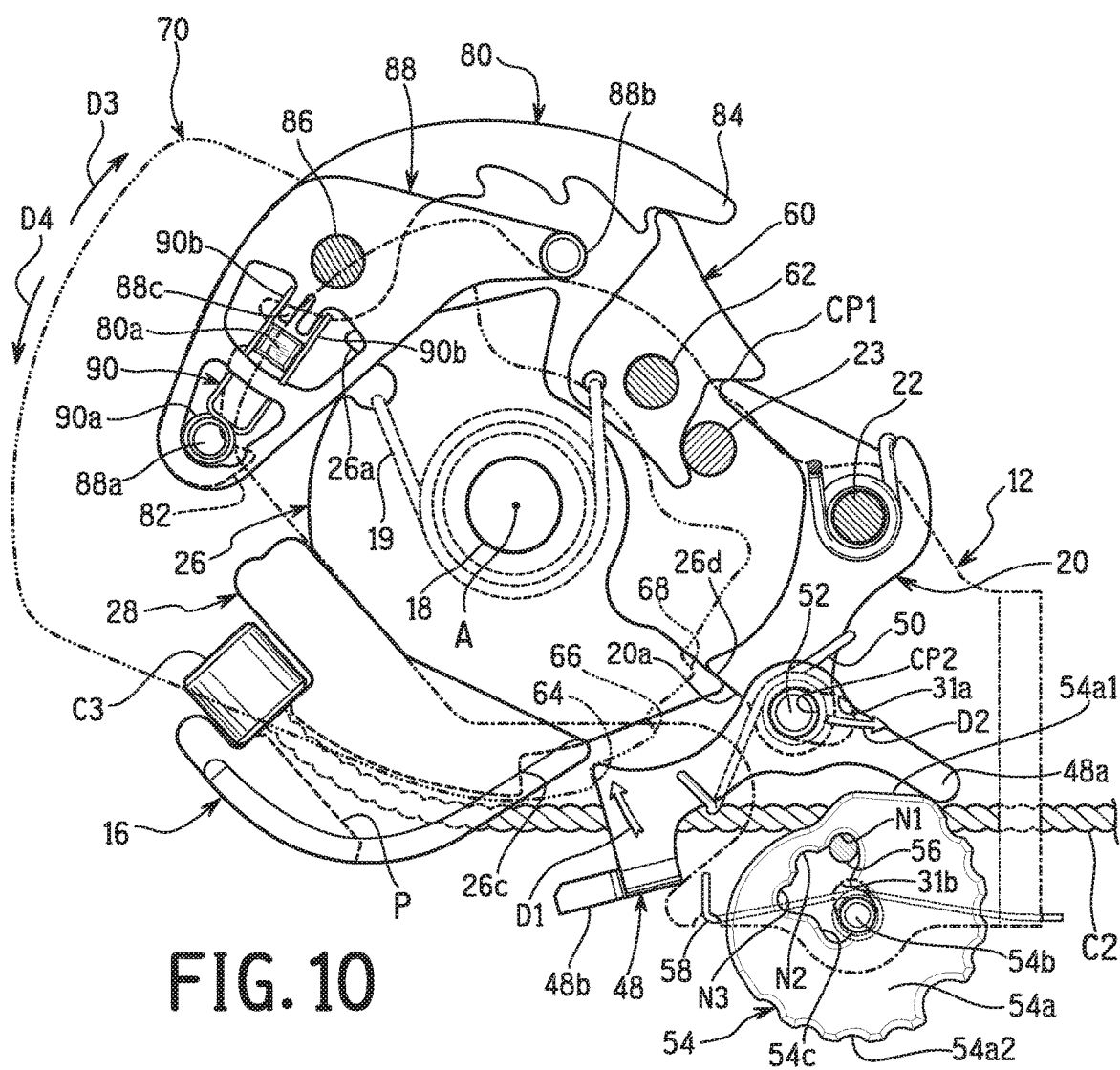
FIG. 10 is an enlarged top plan view of certain parts of the selected parts shown in FIG. 9 in which the user operated input of the bicycle operating device is maintained in the first adjusted rest position.

As seen in FIGS. 9 and 10, when the rest position adjuster 54 is in the first adjustment position (i.e., the detent 56 is in engaged with the first notch N1 of the opening 54c), the first control part 48a of the positioning abutment 48 contacts a first cam section of the cam surface 54a1 of the rest position adjuster 54. In this way, the positioning abutment 48 is prevented from pivoting in the first direction D1 past a first predetermined position. As a result, the positioning abutment 48 engages the user operated input 14 and the user operated input 14 is held in the first adjusted rest position RP1.

Figure 11:
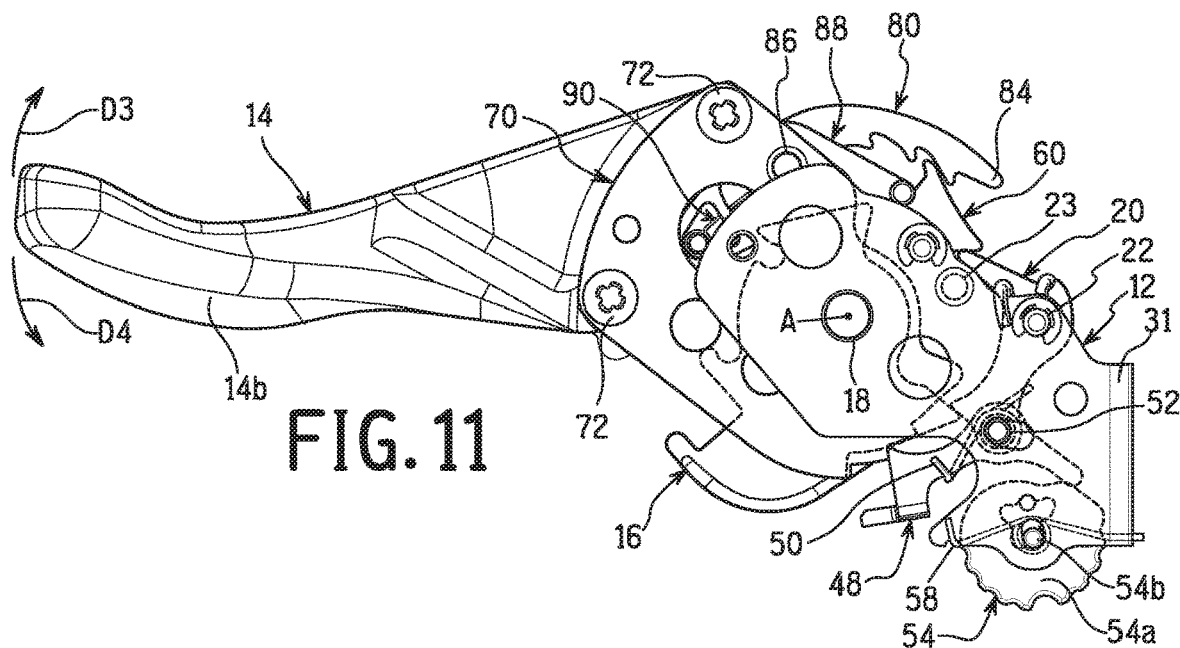
FIG. 11 is a top plan view of the selected parts shown in FIG. 6 in which the user operated input of the bicycle operating device is maintained in a second adjusted rest position.
Figure 12:
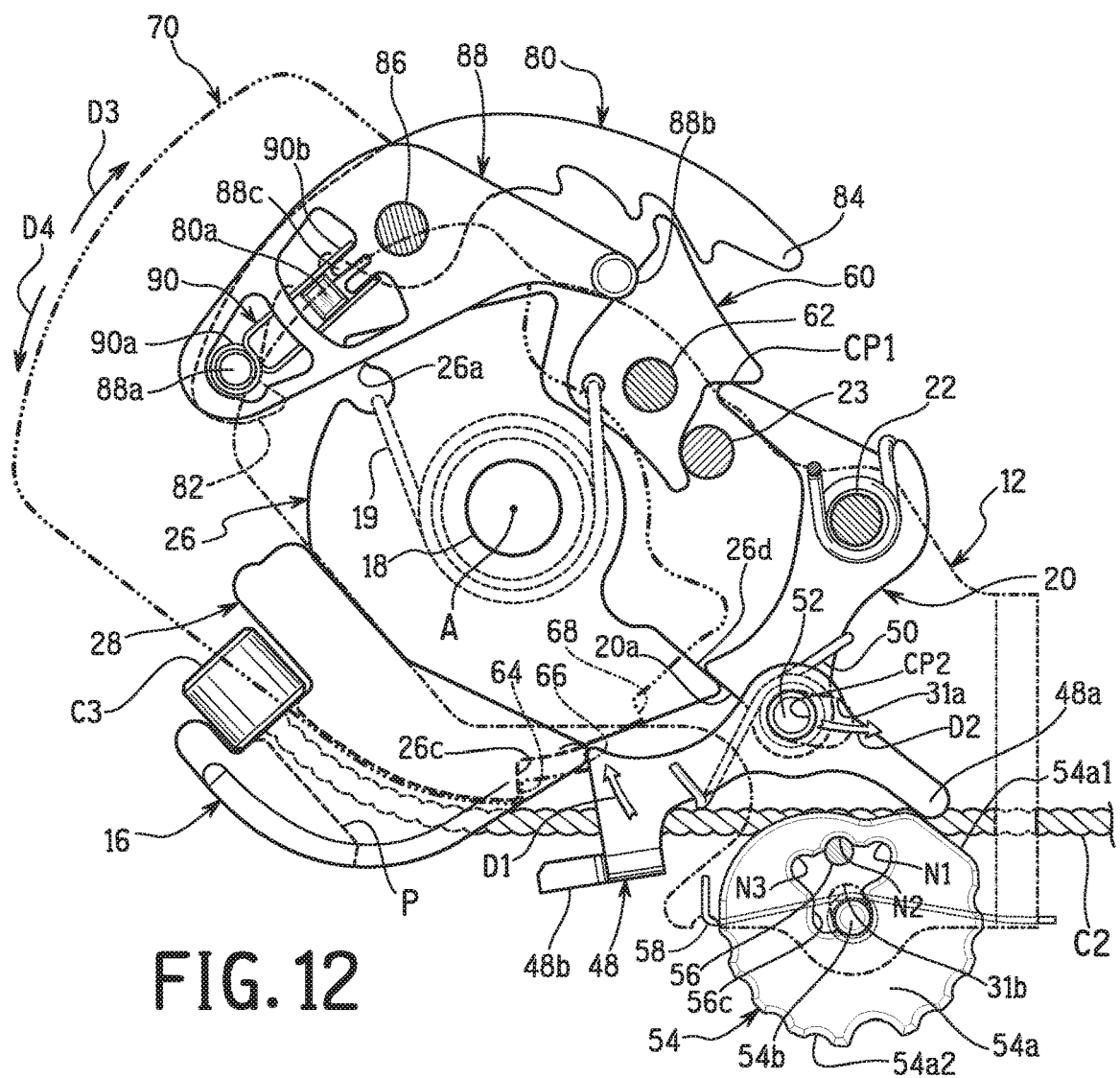
FIG. 12 is an enlarged top plan view of certain parts of the selected parts shown in FIG. 11 in which the user operated input of the bicycle operating device is maintained in the second adjusted rest position.

As seen in FIGS. 11 and 12, when the rest position adjuster 54 is in the second adjustment position (i.e., the detent 56 is in engaged with the second notch N2 of the opening 54c), the first control part 48a of the positioning abutment 48 contacts a second cam section of the cam surface 54a1 of the rest position adjuster 54. In this way, the positioning abutment 48 is prevented from pivoting in the first direction D1 past a second predetermined position. As a result, the positioning abutment 48 engages the user operated input 14 and the user operated input 14 is held in the second adjusted rest position RP2.

Figure 13:
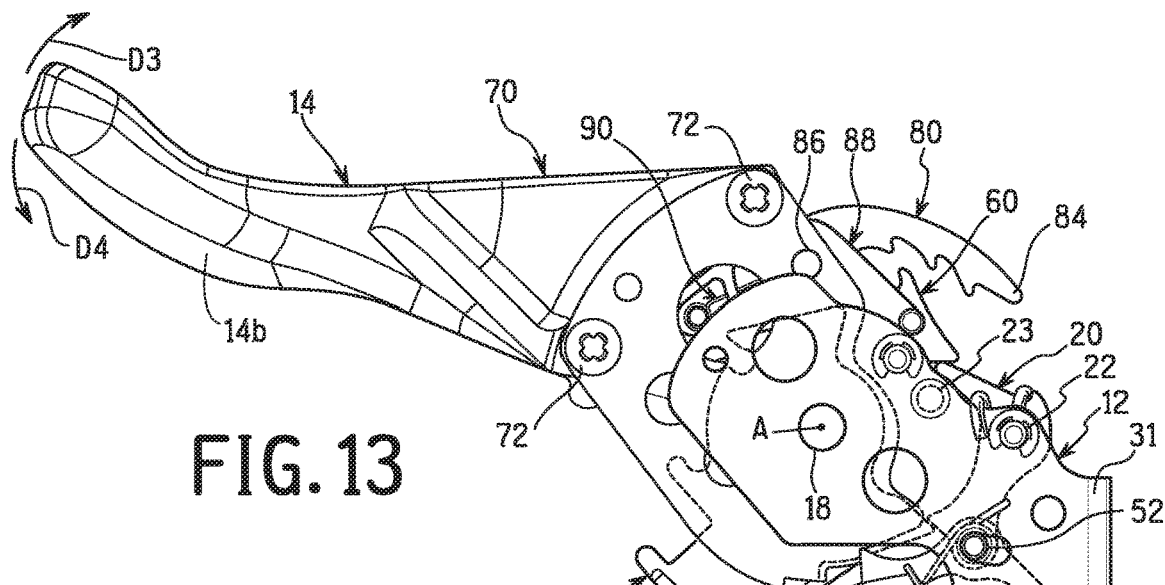
FIG. 13 is a top plan view of the selected parts shown in FIG. 6 in which the user operated input of the bicycle operating device is maintained in a third adjusted rest position.

As seen in FIGS. 13 and 14, when the rest position adjuster 54 is in the third adjustment position (i.e., the detent 56 is in engaged with the third notch N3 of the opening 54c), the first control part 48a of the positioning abutment 48 contacts a third cam section of the cam surface 54a1 of the rest position adjuster 54. In this way, the positioning abutment 48 is prevented from pivoting in the first direction D1 past a third predetermined position. As a result, the positioning abutment 48 engages the user operated input 14 and the user operated input 14 is held in the third adjusted rest position RP3.

A biasing element 58 (e.g., a spring) is provided between the base 12 and the rest position adjuster 54 to biases the detent 56 into one of the notches of the opening 54c. The biasing element 24 is a torsion spring having a coiled portion mounted on the shaft 54b and its opposite free ends engaged with the base 12. The opposed openings 31b and 32a in the first and second internal supports 31 and 32 are slots so that the rest position adjuster 54 slides relative to the base 12 as the rest position adjuster 54 is pivoted relative to the base 12 on the shaft 54b.

In the illustrated embodiment, a cable releasing operation can be performed by a user in two different ways from the adjusted rest position corresponding to the top position. Namely, from the user operated input 14 is pivotally mounted with respect to the base 12 about a pivot axis (i.e., the center axis A) in a third direction D3 and a fourth direction D4 from the adjusted rest position. When the user operated input 14 is the rest position corresponding to the low position, the user operated input 14 can only pivot in the third direction D3 to perform a cable pulling operation.

In a cable releasing operation, the positioning catch 20 is arranged to move in response to receiving a moving force at one of the first and second contact points CP1 and CP2 as the user operated input 14. Specifically, the positioning catch 20 is arranged to move in response to receiving a moving force at the first contact point CP1 as the user operated input 14 pivots in the third direction D3 from the adjusted rest position D3. Also, the positioning catch 20 is arranged to move in response to receiving a moving force at the second contact point CP2 as the user operated input 14 pivots in the fourth direction D4 from the adjusted rest position.

To effectuate a cable releasing operation by moving the user operated input 14 in the third direction D3, a release 60 is provided on the base 12. The release 60 is pivotally mounted on the base by a pivot pin 62. The release 60 is biased by the biasing element 19 that is also used to bias the cable actuator 16 in the cable releasing direction R1 towards the first cable holding position. In particular, the biasing element 19 is a torsion spring having a coiled portion mounted on the shaft 18, a first end engaged with the cable actuator 16, and a second end engaged with the release 60. The biasing element 19 urges both the cable actuator 16 and the release 60 towards engagement with the stop pin 23.

As seen in FIGS. 9 and 10, the user operated input 14 has a first engagement portion 64 selectively abutting the positioning abutment 48 in a state after the user operated input 14 has been moved from the rest position RP0 to the operated position OP to establish the adjusted rest position RP1, RP2 or RP3 in a first adjusted rest position RP1 while the positioning abutment 48 is in the first abutment position. The first abutment position of the positioning abutment 48 is established by setting the rest position adjuster 54 to the first adjustment position (i.e., the detent 56 is in engaged with the first notch N1 of the opening 54c). Thus, the first control part 48a of the positioning abutment 48 contacts a first cam section of the cam surface 54a1 of the rest position adjuster 54. In this way, the positioning abutment 48 is prevented from pivoting in the first direction D1 past the first predetermined position. As a result, the positioning abutment 48 engages the first engagement portion 64 of the user operated input 14 and the user operated input 14 is held in the first adjusted rest position RP1.

As seen in FIGS. 11 and 12, the user operated input 14 has a second engagement portion 66 selectively abutting the positioning abutment 48 in a state after the user operated input 14 has been moved from the rest position RP0 to the operated position OP to establish the adjusted rest position RP1, RP2 or RP3 in a second adjusted rest position RP2 while the positioning abutment 48 is in the second abutment position. The first abutment position is different from the second abutment position. The second abutment position of the positioning abutment 48 is established by setting the rest position adjuster 54 to the second adjustment position (i.e., the detent 56 is in engaged with the second notch N2 of the opening 54c). Thus, the first control part 48a of the positioning abutment 48 contacts a second cam section of the cam surface 54a1 of the rest position adjuster 54. In this way, the positioning abutment 48 is prevented from pivoting in the first direction D1 past the second predetermined position. As a result, the positioning abutment 48 engages the second engagement portion 66 of user operated input 14 and the user operated input 14 is held in the second adjusted rest position RP2.

As seen in FIGS. 13 and 14, here, the user operated input 14 has a third engagement portion 68 that selectively abuts the positioning abutment 48 selectively in a state after the user operated input 14 has been moved from the rest position RP0 to the operated position OP to establish the adjusted rest position RP1, RP2 or RP3 in a third adjusted rest position RP3 while the positioning abutment 48 is in a third abutment position. The third abutment position is different from the first and second abutment positions. The third abutment position of the positioning abutment 48 is established by setting the rest position adjuster 54 is in the third adjustment position (i.e., the detent 56 is in engaged with the third notch N3 of the opening 54*c*), the first control part 48*a* of the positioning abutment 48 contacts a third cam section of the cam surface 54*a*1 of the rest position adjuster 54. In this way, the positioning abutment 48 is prevented from pivoting in the first direction D1 past the third predetermined position. As a result, the positioning abutment 48 engages the third engagement portion 68 of the user operated input 14 and the user operated input 14 is held in the third adjusted rest position RP3.

In the illustrated embodiment, the user operated input 14 further includes a lever plate 70. The lever plate 70 is fixed to the attachment portion 14*a* of the user operated input 14 by a pair of screws 72. Thus, the lever plate 70 moves together with the lever portion 14*b*. The lever plate 70 has the first and second engagement portions 64 and 66 that selectively abut the positioning abutment 48 in a state after the user operated input 14 has been moved from the rest position RP0 to the operated position OP to establish the adjusted rest position RP1, RP2 or RP3 in the first adjusted rest position RP1 while the positioning abutment 48 is in the first abutment position, and the second adjusted rest position RP2 while the positioning abutment 48 is in the second abutment position. The lever plate 70 also has the third engagement portion 68 that selectively abuts the positioning abutment 48 in a state after the user operated input 14 has been moved from the rest position RP0 to the operated position OP to establish the adjusted rest position RP1, RP2 or RP3 in a third adjusted rest position RP3 while the positioning abutment 48 is in a third abutment position.

In the illustrated embodiment, as seen in FIGS. 8, 10, 12, 14 and 16, the user operated input 14 is provided with a driver 80 that includes a pulling hook 82 and a release hook 84. The driver 80 transmits the users input force to either the cable actuator 16 or the release 60 for selectively pulling or releasing the inner wire C1. Here, the driver 80 is pivotally mounted to the user operated input 14 by a pivot pin 86. The movement of the driver 80 is controlled by a control link 88. The control link 88 is also pivotally mounted to the user operated input 14 by the pivot pin 86.

A biasing element 90 is provided to the control link 88 to maintain the position of the driver 80 with respect to the control link 88. In particular, the control link 88 maintains a rotational phase of the driver 80 about the pivot pin 86 with respect to the user operated input 14. The control link 88 includes a first control pin 88*a*, a second control pin 88*b* and an abutment 88*c*. The biasing element 90 is a single wire spring having a coil portion 90*a* mounted on the first control pin 88*a*, and a pair of legs 90*b* that contact opposite sides of the abutment 88*c*. The driver 80 includes a projection 80*a* that protrudes through an opening 88*d* of the control link 88 and in between the legs 90*b* of the biasing element 90. In this way, when the user operated input 14 is in either the rest position RP0 or one of the adjusted rest positions RP1, RP2 or RP3, the driver 80 is overrideably held with respect to the control link 88 in a neutral or center position as seen in FIGS. 8, 10, 12, 14 and 16. When the user operated input 14 is in either the rest position RP0 or one of the adjusted rest positions RP1, RP2 or RP3, the first and second control pins 88*a* and 88*b* contacts a peripheral edge of the lever plate 70 so that the control link 88 does not move with respect to the user operated input 14.

Figure 23:
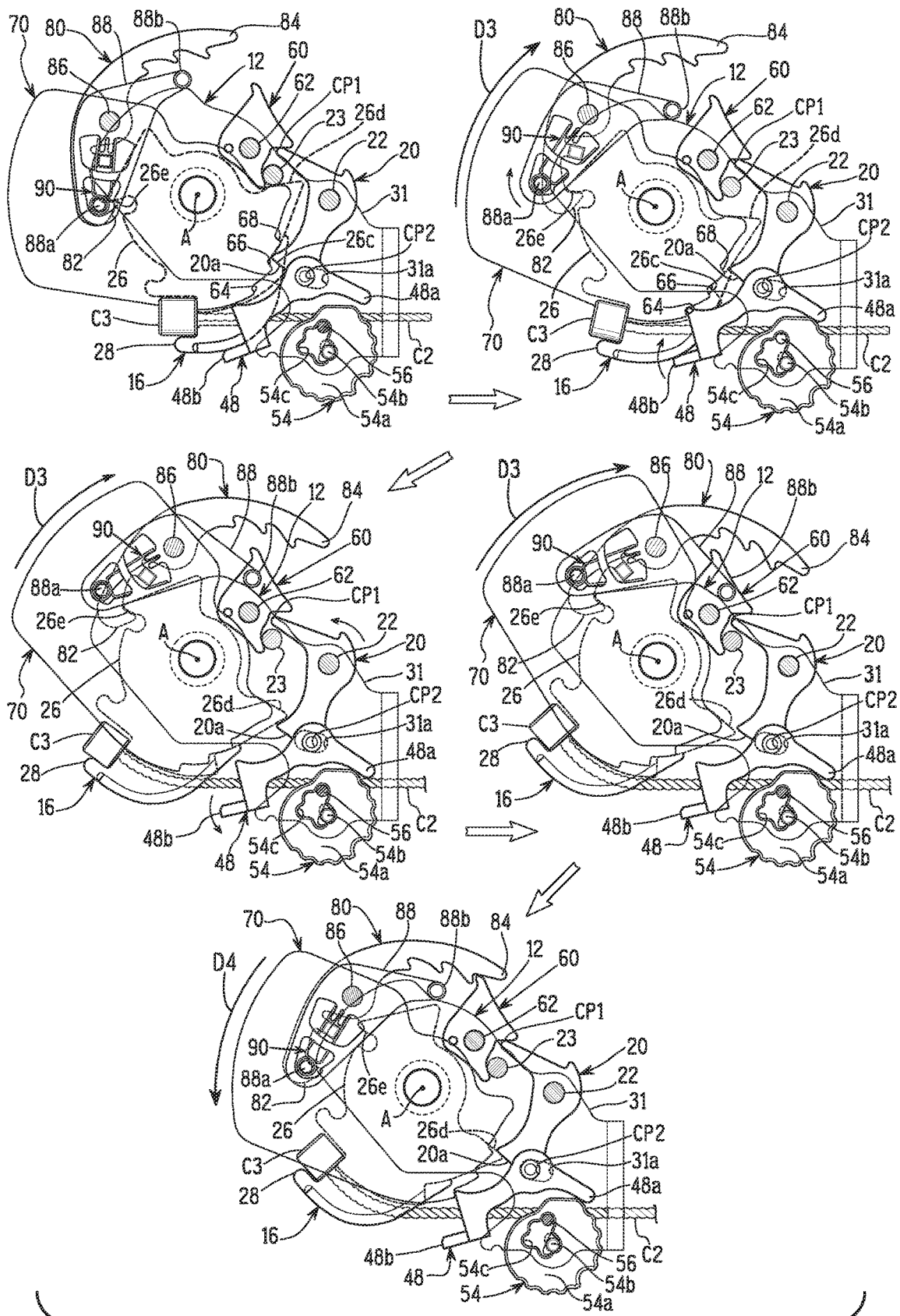
FIG. 23 is a series of diagrammatic views illustrating the user operated input being operated from the rest position to the operated position such that the user operated input pulls the inner wire of the cable and the user operated input returns to the first adjusted rest position.

During a cable pulling operation, as see in FIG. 23, the pulling hook 82 of the driver 80 engages includes the pulling abutment 26*e* of the positioning ratchet 26 for rotating the cable actuator 16 in the cable pulling direction R2 as the user operated input 14 is pivoted in the third direction D3. Since the first and second control pins 88*a* and 88*b* contacts a peripheral edge of the lever plate 70, the control link 88 moves with respect to the user operated input 14. Also, during a cable pulling operation, the driver 80 moves with respect to the control link 88 and the user operated input 14 due to the elastic nature of the biasing element 90. In this way, the driver 80 can remain engaged with the positioning ratchet 26 of the cable actuator 16 during a cable pulling operation and the control link 88 can pivot with respect to the positioning ratchet 26 and the driver 80.

Figure 24:
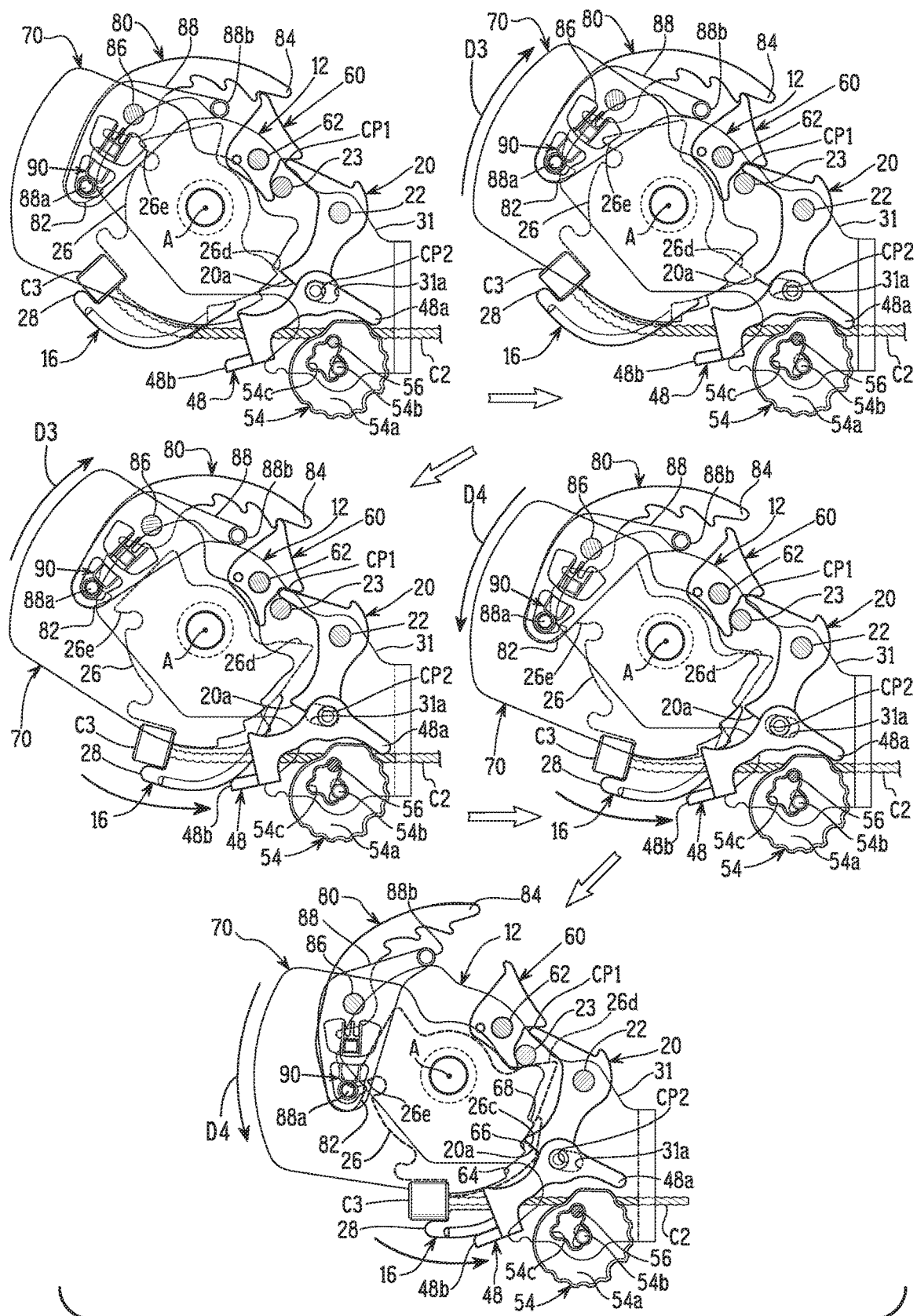
FIG. 24 is a series of diagrammatic views illustrating the user operated input being operated in a third direction from the first adjusted rest position towards the operated position such that the user operated input releases the inner wire of the cable and the user operated input returns to the rest position.
Figure 25:
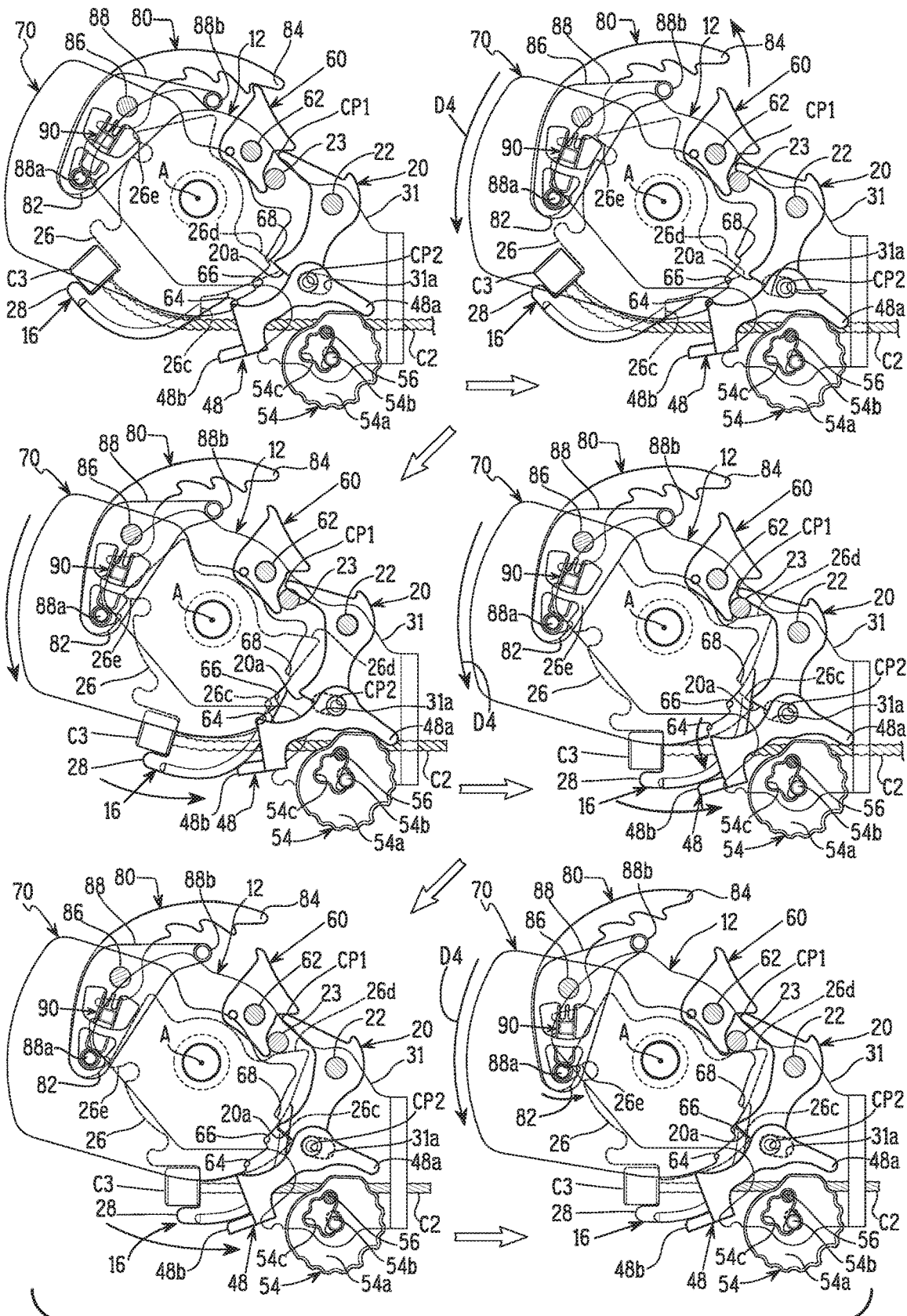
FIG. 25 is a series of diagrammatic views illustrating the user operated input being operated in a fourth direction from the first adjusted rest position to the operated position in a fourth direction such that the user operated input releases the inner wire of the cable and the user operated input returns to the rest position.

On the other hand, during a cable releasing operation, as see in FIGS. 24 and 25, the biasing element 90 maintains the driver 80 in the neutral position with respect to the control link 88. In this way, the release hook 84 of the driver 80 is maintained in the correct orientation to engage the release 60 during a cable releasing operation.

Now, the operation of the user operated input 14 will be discussed in more detail. Basically, as seen in FIG. 23, when the user operated input 14 is pivoted in the third direction D3 from the rest position RP0 to effectuate a cable pulling operation. Specifically, when the user operated input 14 is operated in the third direction D3 from the rest position RP0 to the operated position OP, the cable actuator 16 is pivoted in the cable pulling direction R2 against the biasing force of the biasing element 19. As the user operated input 14 moves in the third direction D3, the positioning catch 20 moves along the edge of the cable actuator 16 and then pivots to the positioning position such that the abutment 20*a* of the positioning catch 20 engages the second stop 26*d* of the cable actuator 16 to establish the second cable holding position of the cable actuator 16. Then when the user operated input 14 is released from the operated position OP with the cable actuator 16 in the second cable holding position, the user operated input 14 returns to one of the adjusted rest position RP1, RP2 or RP3 under the biasing force of the biasing element 46.

Also, as seen in FIGS. 24 and 25, the user operated input 14 can be pivoted in either the third direction D3 or the fourth direction D4 from the adjusted rest position RP1, RP2 or RP3 to effectuate a cable releasing operation. Specifically, the user operated input 14 is operated from the adjusted rest position RP1, RP2 or RP3 in the third direction D3 to move the positioning catch 20 from the positioning position towards the release position. Similarly, the user operated input 14 is operated from the adjusted rest position RP1, RP2 or RP3 in the fourth direction D4 to move the positioning catch 20 from the positioning position towards the release position. With the positioning catch 20 in the release position, the cable actuator 16 pivots in the cable releasing direction R1 under the biasing force of the biasing element 19.

As seen in FIG. 24, when the user operated input 14 is operated in the third direction D3 from the adjusted rest position RP1, RP2 or RP3, the release 60 is pivoted to contact the positioning catch 20 at the first contact point CP1. Thus, the pivotal movement of the release 60 applies a moving force at the first contact point CP1 of the positioning catch 20 as the user operated input 14 pivots in the third direction D3 from the adjusted rest position RP1, RP2 or RP3. As a result of this pivotal movement of the release 60 and the moving force at the first contact point CP1 of the positioning catch 20, the positioning catch 20 pivots from the positioning position to the release position. Now, the cable actuator 16 pivots in the cable releasing direction R1 under the biasing force of the biasing element 19.

As seen in FIG. 25, when the user operated input 14 is operated in the fourth direction D4 from the adjusted rest position RP1, RP2 or RP3, the positioning abutment 48 moves in the second direction D2 to pivot the positioning catch 20 from the positioning position to the release position. In particular, the sliding movement of the positioning abutment 48 in the second direction D2 applies a moving force at the second contact point CP2 of the positioning catch 20 as the user operated input 14 pivots in the fourth direction D4 from the adjusted rest position RP1, RP2 or RP3. As a result of this sliding movement of the positioning abutment 48 in the second direction D2 and the moving force at the second contact point CP2 of the positioning catch 20, the positioning catch 20 pivots from the positioning position to the release position. Now, the cable actuator 16 pivots in the cable releasing direction R1 under the biasing force of the biasing element 19. However, the second control part 48b of the positioning abutment 48 contacts the cable holder 28 of the cable actuator 16 to momentarily stop movement of the cable actuator 16 in the cable releasing direction R1. Then when the user operated input 14 is released from the operated position OP after the releasing operation, the user operated input 14 returns to the rest position RP0 under the biasing force of the biasing element 46. As the user operated input 14 returns to the rest position RP0, the release 60 pivots back to its rest position which in turn releases the positioning catch 20 which pivots to the positioning position. Thus, the positioning abutment 48 slides back in the opposite direction to the second direction D2 to allow the cable actuator 16 to continue to move in the cable releasing direction R1 to the rest position RP0. The first stop 26c of the positioning ratchet 26 contacts the abutment 20a of the positioning catch 20 to stop rotation of the cable actuator 16 in the cable releasing direction R1. Also, at the same time, the abutment 20a of the positioning catch 20 engages the second stop 26d of the cable actuator 16 contacts the stop pin 23 of the base 12. With the positioning catch 20 in the positioning position after a cable releasing operation, the positioning catch 20 is engaged with the cable actuator 16 to prevent further movement of the cable actuator 16 in the cable releasing direction R1. However, in the positioning position, the positioning catch 20 does not prevent movement of the cable actuator 16 in the cable pulling direction R2.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the bicycle operating device. Accordingly, these directional terms, as utilized to describe the bicycle operating device should be interpreted relative to a bicycle in an upright riding position on a horizontal surface and that is equipped with the bicycle operating device. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle operating device comprising:
   a base;
   a user operated input movably arranged with respect to the base from a rest position towards an operated position;

a cable actuator movably arranged with respect to the base in response to movement of the user operated input between at least first and second cable holding positions;

a rest position adjuster movably arranged with respect to the base; and a positioning abutment movably supported on the base between at least a first abutment position and a second abutment position, the positioning abutment biased into a predetermined position until further movement is prevented by the rest position adjuster for selective engagement with the user operated input in response to actuation of the user operated input from the rest position to the operated position to cause the user operated input to return from the operated position to an adjusted rest position instead of the rest position, the adjusted rest position being different from the rest position.

2. A bicycle operating device comprising:

a base supporting a housing having a sidewall;

a user operated input movably arranged with respect to the base from a rest position towards an operated position;

a cable actuator movably arranged with respect to the base in response to movement of the user operated input, the cable actuator being disposed in the housing; and a rest position adjuster movably arranged with respect to the base to selectively establish at least a first adjusted rest position of the user operated input when the rest position adjuster is in a first adjustment position and a second adjusted rest position of the user operated input when the rest position adjuster is in a second adjustment position, the user operated input movable with respect to the rest position adjuster such that upon actuation of the user operated input from the rest position to the operated position the user operated input returns (i) from the operated position to the first adjusted rest position instead of the rest position when the rest position adjuster has been placed in the first adjustment position and (ii) from the operated position to the second adjusted rest position instead of the rest position when the rest position adjuster has been placed in the second adjustment position, the first and second adjusted rest positions being different from the rest position, a part of the rest position adjuster extending outside of the sidewall of the housing.

3. A bicycle operating device comprising:

a base;

a user operated input movably arranged with respect to the base from a rest position towards an operated position; and a cable actuator movably arranged with respect to the base to pivot around a center axis in response to movement of the user operated input, the cable actuator including a positioning ratchet and a cable holder, the positioning ratchet and the cable holder being separate pieces that are coupled and move together, the cable holder coupled to a peripheral edge of the positioning ratchet so that the cable holder and positioning ratchet are configured to pull a cable wire along a cable path defined therebetween with the cable wire located between the positioning ratchet and the cable holder in a radial direction with respect to the center axis.

4. A bicycle operating device comprising:

a base;

a user operated input movably arranged with respect to the base from a rest position towards an operated position;

a cable actuator movably arranged with respect to the base in response to movement of the user operated input between at least first and second cable holding positions; and a positioning abutment movably supported on the base between at least a first abutment position and a second abutment position, the positioning abutment selectively engaging the user operated input to position the user operated input at an adjusted rest position in a state after the user operated input has been moved from the rest position to the operated position, the adjusted rest position being different from the rest position;

the positioning abutment pivotally arranged with respect to the base in a first direction and slidably arranged with respect to the base in a second direction that is different from the first direction.

5. The bicycle operating device according to claim 4, further comprising:

a positioning catch movably arranged with respect to the base;

the cable actuator being selectively maintained in each of the first and second cable holding positions by the positioning catch; and the positioning abutment being arranged to move the positioning catch as the positioning abutment moves in the second direction.

6. The bicycle operating device according to claim 5, wherein the user operated input is pivotally mounted with respect to the base about a pivot axis in a third direction and a fourth direction from the adjusted rest position.

7. The bicycle operating device according to claim 6, wherein the positioning catch has a first contact point and a second contact point, the positioning catch being arranged to move in response to receiving a moving force at the first contact point as the user operated input pivots in the third direction from the adjusted rest position, and the positioning catch being arranged to move in response to receiving a moving force at the second contact point as the user operated input pivots in the fourth direction from the adjusted rest position.

8. The bicycle operating device according to claim 6, wherein the positioning catch has a positioning position and a release position, which differs from the positioning position, the user operated input is operated from the adjusted rest position in the third direction to move the positioning catch from the positioning position towards the release position, and the user operated input is operated from the adjusted rest position in the fourth direction to move the positioning catch from the positioning position towards the release position.

9. The bicycle operating device according to claim 4, wherein the cable actuator includes a positioning ratchet and a cable holder, the positioning ratchet and the cable holder being coupled and move together.

10. The bicycle operating device according to claim 9, wherein the positioning ratchet and the cable holder are separate pieces that are coupled and move together, and the positioning ratchet and the cable holder define a cable path therebetween.

11. The bicycle operating device according to claim 4, further comprising
a rest position adjuster movably arranged with respect to the base between at least two adjustment positions, the positioning abutment being moved in response to the rest position adjuster being moved.

12. The bicycle operating device according to claim 11, wherein
the rest position adjuster is pivotally mounted with respect to the base.

13. The bicycle operating device according to claim 11, wherein
the rest position adjuster is selectively maintained in the at least two adjustment positions by a detent.

14. The bicycle operating device according to claim 4, wherein
the user operated input has a first engagement portion selectively abutting the positioning abutment in a state after the user operated input has been moved from the rest position to the operated position to establish the adjusted rest position in a first adjusted rest position while the positioning abutment is in the first abutment position,
the user operated input has a second engagement portion selectively abutting the positioning abutment in a state after the user operated input has been moved from the rest position to the operated position to establish the adjusted rest position in a second adjusted rest position while the positioning abutment is in the second abutment position, the first abutment position being different from the second abutment position.

15. The bicycle operating device according to claim 14, wherein
the user operated input has a third engagement portion selectively abutting the positioning abutment in a state after the user operated input has been moved from the rest position to the operated position to establish the adjusted rest position in a third adjusted rest position while the positioning abutment is in a third abutment position that different from the first and second abutment positions.

16. The bicycle operating device according to claim 4, further comprising
a shaft supporting the cable actuator and the user operated input to pivot with respect to the base about a center axis of the shaft.

17. The bicycle operating device according to claim 16, wherein
the user operated input is biased with respect to the base in a direction towards the rest position.

18. The bicycle operating device according to claim 4, further comprising
a housing that accommodates the cable actuator inside the housing.

19. The bicycle operating device according to claim 18, further comprising
a handlebar attachment coupled to the base.

20. The bicycle operating device according to claim 18, wherein
the user operated input includes an attachment portion that is disposed inside of the housing and a lever portion that extends outside of the housing from the attachment portion.

21. The bicycle operating device according to claim 20, wherein
the user operated input further includes a lever plate having first and second engagement portions that selectively abut the positioning abutment in a state after the user operated input has been moved from the rest position to the operated position to establish the adjusted rest position in
a first adjusted rest position while the positioning abutment is in the first abutment position, and
a second adjusted rest position while the positioning abutment is in the second abutment position, the first abutment position being different from the second abutment position.

* * * * *